United States Patent
Sugano et al.

(10) Patent No.: US 6,763,449 B1
(45) Date of Patent: Jul. 13, 2004

(54) OPERATION-PROCESSING APPARATUS

(75) Inventors: Fumitake Sugano, Kawasaki (JP); Katsunori Takeshita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 576 days.

(21) Appl. No.: 09/693,920

(22) Filed: Oct. 23, 2000

(30) Foreign Application Priority Data

Apr. 12, 2000 (JP) ........................................ 2000-111340

(51) Int. Cl.$^7$ .............................. G06F 9/318; G06F 9/44
(52) U.S. Cl. ........................ 712/210; 712/213; 712/203; 717/107; 717/141
(58) Field of Search ................................. 712/210, 227, 712/212, 300, 35, 34, 30, 31, 41, 43, 32, 203, 213; 717/122, 124, 134, 140, 107, 170, 141; 703/26, 27

(56) References Cited

U.S. PATENT DOCUMENTS

| | | | | |
|---|---|---|---|---|
| 5,038,318 A | * | 8/1991 | Roseman | 712/30 |
| 5,574,927 A | * | 11/1996 | Scantlin | 712/41 |
| 5,848,289 A | | 12/1998 | Studor et al. | 712/32 |
| 5,889,947 A | * | 3/1999 | Starke | 709/213 |
| 5,909,565 A | | 6/1999 | Morikawa et al. | 712/200 |

FOREIGN PATENT DOCUMENTS

JP         HEI 7-36691 A       2/1995

* cited by examiner

*Primary Examiner*—Daniel H. Pan
(74) *Attorney, Agent, or Firm*—Staas & Halsey LLP

(57) ABSTRACT

An operation-processing apparatus is equipped with an instruction decoder for decoding an existing instruction and an extension instruction into the same operation code including at least instruction-type-determining bits for determining the existing instruction or the extension instruction, an existing-operation-executing unit for executing an existing operation according to the operation code and outputting an operation-termination-notifying signal, an extension-operation-executing unit that operates in synchronism with the existing-operation-executing unit to thereby execute an extension operation according to the operation code, a control circuit for determining the type of the instruction according to the instruction-type-determining bits, and a multiplexer that, when the type of the instruction has been determined to be the extension instruction and when an operation-termination-notifying signal has been input, selects an extension instruction operated-result data.

6 Claims, 14 Drawing Sheets

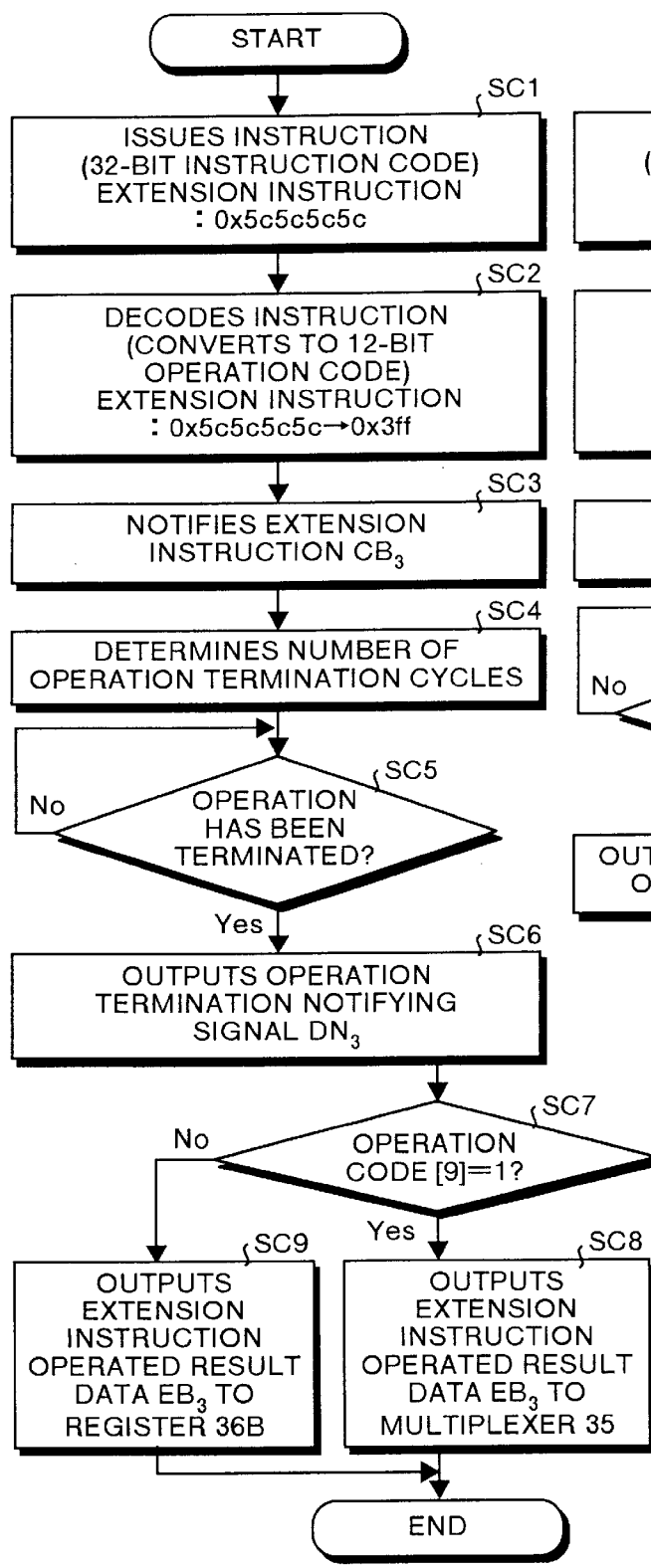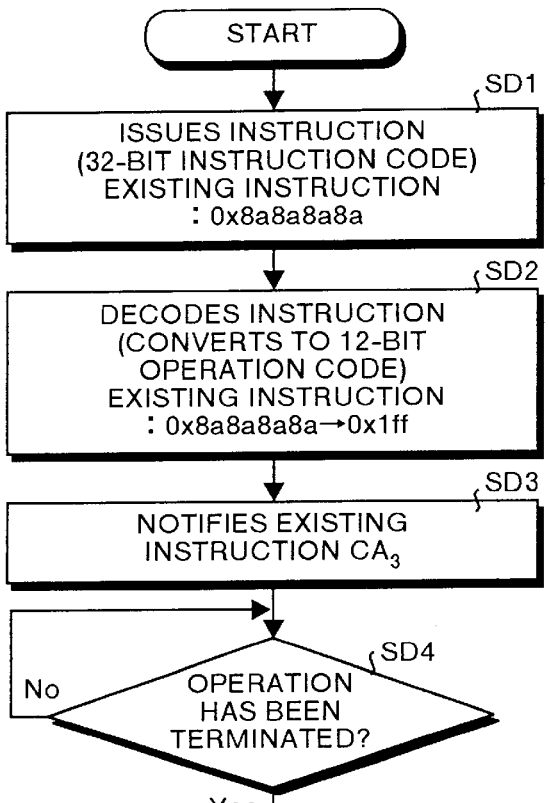

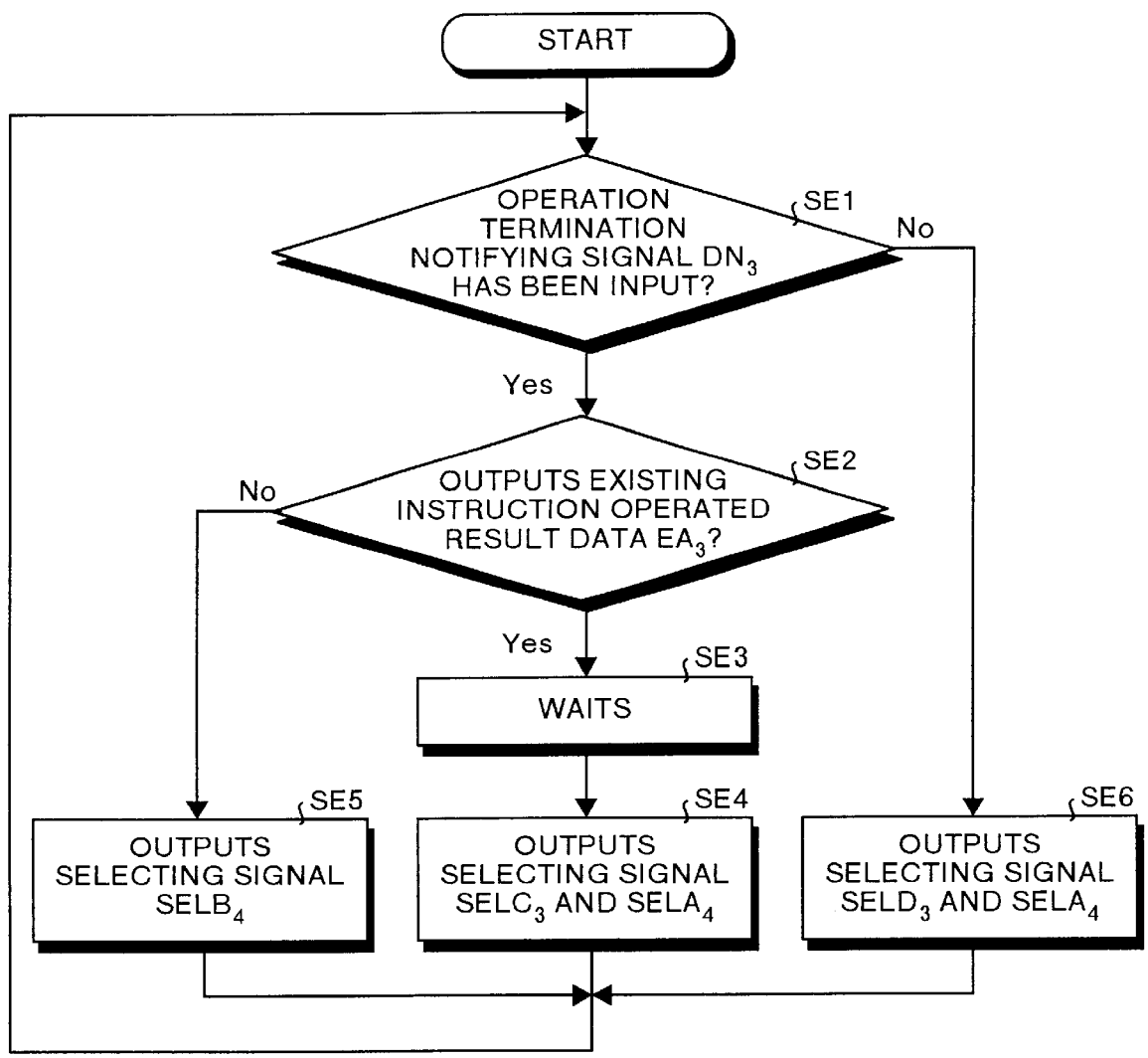

OPERATION-PROCESSING APPARATUS

FIELD OF THE INVENTION

The present invention relates to an operation-processing apparatus and, more particularly, to an operation-processing apparatus that is suitably used for executing a customized operation wherein an extension instruction (new instruction) is added to an existing instruction.

BACKGROUND OF THE INVENTION

Recently, owing to a demand for the enhancement in the performance of computers, the competition for the development of operation-processing apparatuses such as CPU (Central Processing Unit) or MPU (Micro Processing Unit) has become more and more vigorous. The existing circumstance therefore is that the developing makers have had to put operation-processing apparatuses each having a new function loaded therein into the markets one after another. Therefore, at how low a cost and in how short a period they can develop their operation-processing apparatus have been being a key for predomination over the markets.

An operation-processing apparatus is incorporated into every piece of computer from personal computers to supercomputers. It is, in other words, an apparatus that is a main requisite for any computer. Generally, it is comprised of an instruction decoder for decoding an operation instruction, an operation-executing unit for executing various types of operation such as an arithmetic operation or logical operation according to an operation instruction (operation codes) obtained from the decoding performed by the instruction decoder, a register for temporarily storing the result of the operation (the operated-result data) executed by the operation-executing unit, and control circuits (e.g., a pipeline control circuit, a state machine, etc.) for executing the control of the operation-executing unit, for executing the control of the storage of the operated-result data into a register (e.g., an integer register or a floating-point numeric-value register), etc. In this operation-processing apparatus, various types of operation each according with a relevant instruction and the storage of the operated-result data are executed with an ultra-high speed.

By the way, as stated above, in the conventional operation-processing apparatus, the customizing wherein a new operation instruction (hereinafter referred to as "an extension instruction" is added to an existing operation instruction (hereinafter referred to as "an existing instruction") is performed. In this customizing, in case that the contents of the operation corresponding to the existing instruction and those corresponding to the extension instruction differ from each other or in case that the extension instruction cannot be executed in an applied form wherein the existing instruction is used as an application therefor, a control circuit corresponding to the extension instruction must be additionally provided. For this reason, there was the problem that the portions where a change in design of the existing mechanism is made were increased in number.

Also, in the conventional operation-processing apparatus, integral operated-result data is stored in an integer register while floating-point operated-result data is registered in a floating-point numeric-value register. Namely, in general, the type of the operated-result data (integer or floating-point numeric value) and the type of the register are the same. Here, there is a case where, according to the demand of the customizing, a special extension instruction is added of that a different type of operated-result data is to be stored in the register. In this kind of customizing, an existing path for leading the operated-result data to the register must be re-designed. Therefore, there was the problem that the change in design had to be made on a large scale.

SUMMARY OF THE INVENTION

It is an object of the present invention to provide an operation-processing apparatus in which an extension instruction can be added to an existing mechanism with a minimum necessary change in design with respect thereto.

To attain the above object, according to the first aspect of the invention, there is provided an operation-processing apparatus comprising instruction-decoding means (corresponding to an instruction decoder 10 of a first embodiment as later described) for decoding an existing instruction and an extension instruction into the same operation code including at least instruction-type-determining information for determining the existing instruction or the extension instruction, existing-operation-executing means (corresponding to an existing-operation-executing unit 12A of the first embodiment as later described) for executing an existing operation according to the operation code and outputting an operation-termination-notifying signal, extension-operation-executing means (corresponding to an extension-operation-executing unit 12B of the first embodiment as later described) that operates in synchronism with the existing-operation-executing means to thereby execute an extension operation according to the operation code, instruction-type-determining means (corresponding to a control circuit 11 of the first embodiment as later described) for determining the type of the instruction according to the instruction-type-determining information, and selecting means (corresponding to a multiplexer 13 of the first embodiment as later described) for, when the type of the instruction has been determined to be the extension instruction and the operation-termination-notifying signal has been input, selecting operated-result data of the extension-operation-executing means.

According to the above-described invention, when the extension instruction is issued, the extension instruction is decoded into the operation code by the instruction-decoding means. This operation codes is notified to both of the existing-operation-executing means and the extension-operation means, which synchronously execute their relevant operations. And, upon completion of the operations, an operation-termination-notifying signal is output from the existing-operation-executing means. Assume here that it is being determined that the type of the instruction is the extension instruction. Then, the selecting means selects the operated-result data of the extension-operation-executing means.

In this way, according to the above-described invention, the operation code is made to contain the instruction-type-determining information. Thereby, even when the extension instruction has been issued, utilizing the operation-termination-notifying signal output from the existing-operation-executing means, the termination of the operation of the extension-operation-executing means is recognized to thereby select the operated-result data of the extension-operation-executing means. Therefore, it is possible to add the extension instruction to the existing mechanism with a minimum necessary change in design made with respect thereto.

Also, according to the second aspect of the invention, in the operation-processing apparatus as described in the first aspect of the invention, the selecting means selects, when the type of the instruction has been determined to be the extension instruction and the operation-termination-notifying signal has been input, the operated-result data of the extension-operation-executing means.

According to this above-described invention, it is arranged that when the type of the instruction has been determined to be the existing instruction there is selected the operated-result data of the existing-operation-executing means. Therefore, it is possible to add the extension instruction without making any change of the existing-operation-executing means.

Also, according to the third aspect of the invention, there is provided an operation-processing apparatus comprising instruction-decoding means (corresponding to an instruction decoder 20 of a second embodiment as later described) for decoding an existing instruction and an extension instruction into the same operation code including at least type-determining information for determining the type of operated-result data regarding a forwarded destination, existing-operation-executing means (corresponding to an existing-operation-executing unit 22A of the second embodiment as later described) for executing an existing operation regarding a first type according to the operation code and outputting an operation-termination-notifying signal, first holding means (corresponding to a register 24A of the second embodiment as later described) that is provided in correspondence with the existing-operation-executing means, extension-operation-executing means (corresponding to an extension-operation-executing unit 22B of the second embodiment as later described that operates in synchronism with the existing-operation-executing means to thereby execute an extension operation regarding a second type according to the operation code, second holding means (corresponding to a register 24B of the second embodiment as later described) that is provided in correspondence with extension-operation-executing means, and forwarding means (corresponding to a control circuit 21A and multiplexer 23 of the second embodiment as later described) that, when it has been determined according to the type-determining information that the type of the operated-result data of the extension-operation-executing means is different from the type of the data of the first holding means constituting the forwarded destination and when the operation-termination-notifying signal has been input, forwards the operated-result data of the extension-operation-executing means to the first holding means.

According to this above-described invention, when the extension instruction is issued, the extension instruction is decoded into the operation code by the instruction-decoding means. This operation code is notified to both of the existing-operation-executing means and the extension-operation-executing means, which synchronously execute their relevant operations. And, upon completion of the operations, an operation-termination-notifying signal is output from the existing-operation-executing means. Assume at this time that it has been determined that the type of the operated-result data of the extension-operation-executing means is different from the type of the data of the first holding means of the forwarded destination. Then, the forwarding means forwards the operated-result data to the forwarding means.

In this way, according to this above-described invention, it is arranged that according to the type-determining information contained in the operation code the operated-result data of the extension-operation-executing means is forwarded to the first holding means. Therefore, it is possible to add the extension instruction to the existing mechanism with a minimum necessary change in design made with respect thereto.

Also, according to the fourth aspect of the invention, there is provided an operation-processing apparatus comprising instruction-decoding means (corresponding to an instruction decoder 30A and instruction decoder 30B of a third embodiment as later described) for decoding an existing instruction and an extension instruction into the same operation code including at least type-determining information for determining the type of operated-result data regarding a forwarded destination, existing-operation-executing means (corresponding to an existing-operation-executing means 32A of the third embodiment as later described) for executing an existing operation regarding a first type according to the operation code, first holding means (corresponding to a register 36A of the third embodiment as later described) that is provided in correspondence with the existing-operation-executing means, extension-operation-executing means (corresponding to an extension-operation-executing unit 32B of the third embodiment as later described) that operates in asynchronism with the existing-operation-executing means to thereby execute an extension operation regarding a second type according to the operation code, outputting means (corresponding to a control circuit 31B of the third embodiment as later described) for outputting an operation-termination-notifying signal indicating the effect that the operation of the extension-operation-executing means has ended, second holding means (corresponding to a register 36B of the third embodiment as later described) that is provided in correspondence with extension-operation-executing means, and forwarding means (corresponding to a control circuit 31A and multiplexer 35 of the third embodiment as later described) that, when it has been determined according to the type-determining information that the type of the operated-result data of the extension-operation-executing means is different from the type of the data of the first holding means constituting the forwarded destination and when the operation-termination-notifying signal has been input, forwards the operated-result data of the extension-operation-executing means to the first holding means.

According to this above-described invention, when the extension instruction and the existing instruction are issued, the extension instruction and the existing instruction are respectively decoded into the operation codes by the instruction-decoding means. These operation codes are respectively notified to both of the existing-operation-executing means and the extension-operation-executing means, which asynchronously execute their relevant operations. And, upon completion of the operation of the extension-operation-executing means, an operation-termination-notifying signal is output from the outputting means. Assume at this time that the type of the operated-result data of the extension-operation-executing means is different from the type of the data of the first holding means constituting the forwarded destination. Then, the operated-result data is forwarded to the first holding means by the forwarding means.

In this way, according to that above-described invention, it is arranged to output the operation-termination-notifying signal regarding the extension-operation-executing means and, according to the type-determining information contained in the operation code, to forward the operated-result data of the extension-operation-executing means to the first holding means. Therefore, even when the extension-operation-executing means and the existing-operation-executing means operate in asynchronism with each other, it is possible to add the extension instruction to the existing mechanism with a minimum necessary change in design made with respect thereto.

Also, according to the fifth aspect of the invention, in the operation-processing apparatus according to the fourth aspect of the invention, the apparatus further comprises mediating means (corresponding to a control circuit 31A of the third embodiment as later described) for, when the operation-termination-notifying signal has been input, performing mediation between an outputting timing of the operated-result data of the existing-operation-executing means taken with respect to the first holding means and a forwarding timing of the operated-result data of the extension-operation-executing means.

According to this above-described invention, it is arranged that the timing-mediating means performs mediation between the outputting timing of the operated-result data of the existing-operation-executing means taken with respect to the first holding means and the forwarding timing of the operated-result data of the extension-operation-executing means. Therefore, it is possible to prevent batting that would occur with the same timing from occurring.

Also, the invention as described under Addition No. 3 as later described comprises, in the operation-processing apparatus as described under Addition No. 1 or 2, holding means for holding the operated-result data selected by the selecting means.

According to this above-described invention, by providing the selecting means, it is arranged to select the operated-result data held in the holding means according to the determined result of the type of the instruction. Therefore, it is not necessary to add the holding means for use for the extension instruction, with the result that the cost can be reduced.

Other objects and features of this invention will become understood from the following description with reference to the accompanying drawings.

BRIEF DESCRIPTION OF THE DRAWINGS

FIGS. 6A, B are flow charts illustrating the operation of the third embodiment;

FIG. 7 is a flow chart illustrating the operation of a control circuit 31A illustrated in FIG. 5;

DESCRIPTION OF THE PREFERRED EMBODIMENTS

Figure 1:
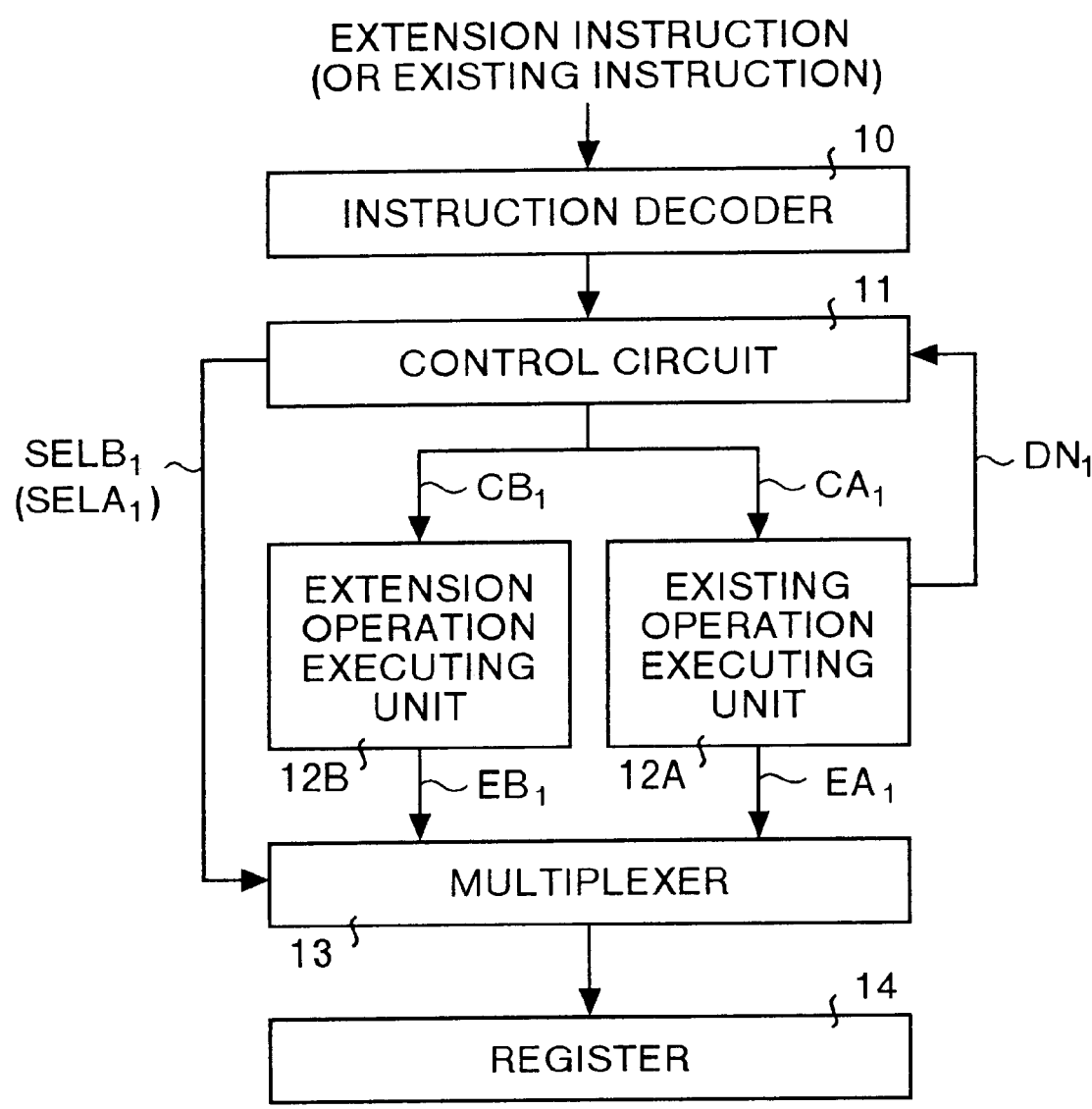
FIG. 1 is a block diagram illustrating the construction of a first embodiment of the present invention.

FIG. 1 is a block diagram illustrating the construction of a first embodiment of the present invention. In this figure, illustration is made of the construction of a main part of an operation-processing apparatus after an extension instruction is added to an existing instruction according to the request made by customizing. Here, the existing instruction is, for example, an integer-addition instruction while the extension instruction is, for example, an integer-multiplication instruction. Each of these existing instruction and extension instruction consists of an instruction code composed of 32 bits, and both of them are respectively expressed as follows when so done in the form of a hexadecimal representation.

Existing instruction: 0x8a8a8a8a

Extension instruction: 0x5c5c5c5c

An instruction decoder 10 decodes the 32-bit existing instruction and the 32-bit extension instruction into 12-bit operation codes (an existing instruction $CA_1$ and extension instruction $CB_1$). These existing instruction $CA_1$ and extension instruction $CB_1$ are respectively expressed as follows when so done in the form of a hexadecimal representation (binary representation).

Existing instruction $CA_1$: 0x1ff (000111111111)

Extension instruction $CB_1$: 0x3ff (001111111111)

The bits constituting each of these existing instruction $CA_1$ and extension instruction $CB_1$ that are actually effective as the instructions are "11:10, 8:0" bits. From this, because the "11:10, 8:0" bits constituting each of these existing instruction $CA_1$ and extension instruction $CB_1$ each have the same value, the existing instruction $CA_1$ and extension instruction $CB_1$ are the ones the bit constructions of that are the same. Also, the "9" bits of each of the existing instruction $CA_1$ and extension instruction $CB_1$ are dummy bits that are not used as the bits for use for the instruction. However, in the first embodiment, those "9" bits are instruction-type-determining bits for determining the existing instruction $CA_1$ and extension instruction $CB_1$. Namely, when the "9" bits each have a value of "0", the type of the instruction is the existing instruction. On the other hand, when the "9" bits each have a value of "1", the type of the instruction is the extension instruction.

A control circuit 11 controls the notification of the existing instruction $CA_1$ and extension instruction $CB_1$ with respect to an existing-operation-executing unit 12A and an extension-operation-executing unit 12B and the storage of the operated-result data into a register 14. The existing-operation-executing unit 12A is an existing-operation-executing unit, which according to the existing instruction $CA_1$ executes integer addition and outputs an operation-termination-notifying signal $DN_1$ indicating the effect that the operation has ended to the control circuit 11. Also, the existing-operation-executing unit 12A outputs the operated result as an existing-instruction operated-result data $EA_1$.

The extension-operation-executing unit 12B is the one that has been added to the existing mechanism by customizing and that executes integer multiplication according to the extension instruction $CB_1$. The extension-operation-executing unit 12B outputs the operated result as an extension-instruction operated-result data $EB_1$. Here, the number of the operation-termination cycles of the existing-operation-executing unit 12A and the number of the operation-termination cycles of the extension-operation-executing unit 12B are made to be the same. It is to be noted here that no signal corresponding to the operation-termination-notifying signal $DN_1$ is output from the extension-operation-executing unit 12B. It is also to be noted that the type (an integer in this case) of the existing-instruction operated-result data $EA_1$ and the type (an integer in this case) of the extension-instruction operated-result data $EB_1$ are made to be the same.

A multiplexer 13 selects either one of the existing-instruction operated-result data $EA_1$ and the extension-instruction operated-result data $EB_1$ according to the control of the control circuit 11 and outputs this selected data to a register 14. Specifically, when a selecting signal $SELA_1$ has been input from the control circuit 11, the multiplexer 13 outputs the existing-instruction operated-result data $EA_1$ to the register 14. On the other hand, when a selecting signal $SELB_1$ has been input from the control circuit 11, the multiplexer 13 outputs the extension-instruction operated-result data $EB_1$ to the register 14. The register 14 is, for example, an integer register, which temporarily stores therein the existing-instruction operated-result data $EA_1$ or the extension-instruction operated-result data $EB_1$.

Figure 2:
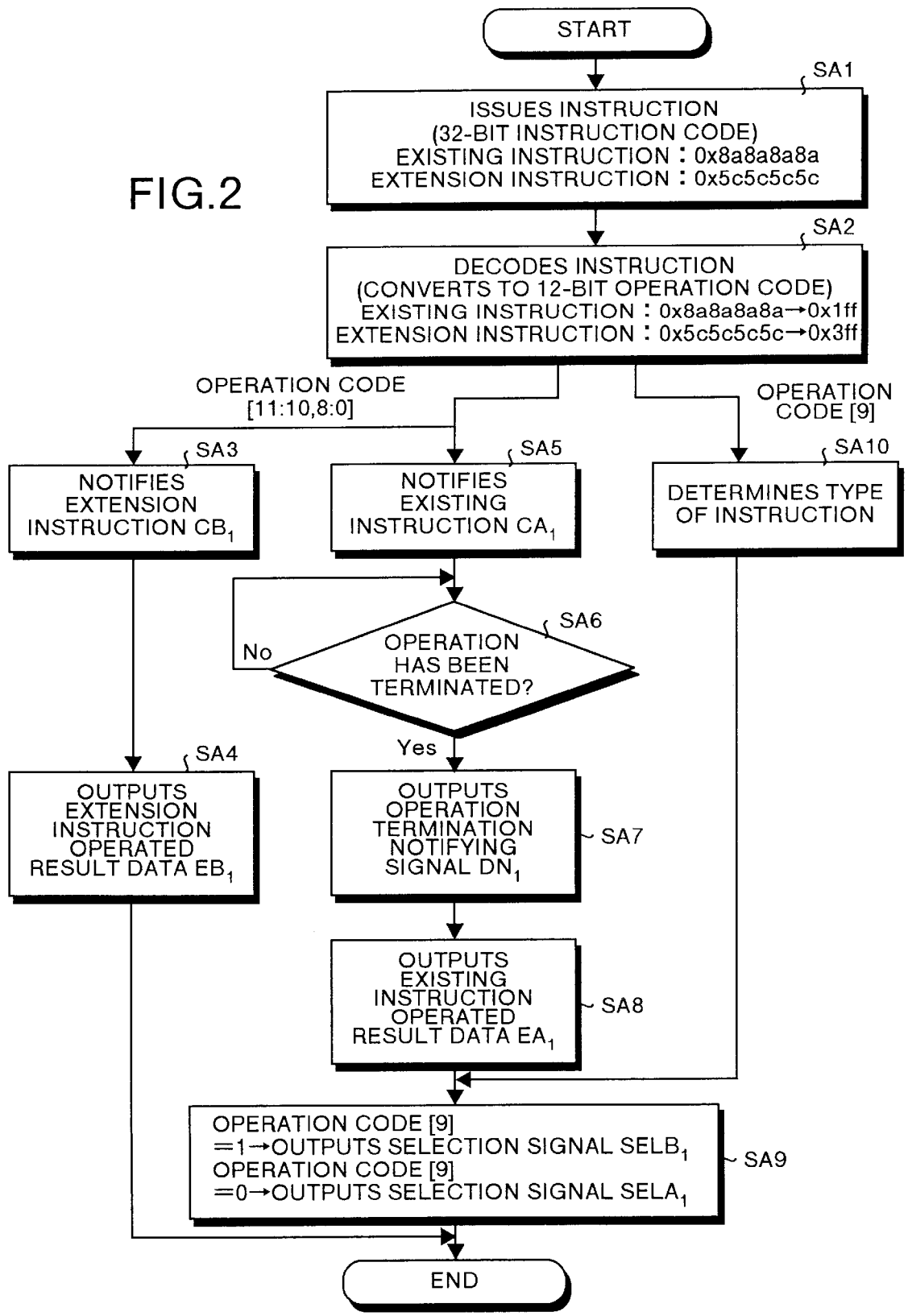
FIG. 2 is a flow chart illustrating the operation of the first embodiment.

Next, the operation of the above-described first embodiment will be explained with reference to a flow chart illustrated in FIG. 2. When in a step SA1 illustrated in this figure the 32-bit existing instruction (0x8a8a8a8a) is issued, in step SA2 the instruction decoder 10 converts the existing instruction (0x8a8a8a8a) into the 12-bit operation code (0x1ff (000111111111)). Thereafter, the instruction decoder 10 notifies the thus-converted data to the control circuit 11. As a result of this, in step SA3 and step SA5, the control circuit 11 notifies the extension instruction $CB_1$ (0x1ff (000111111111) in this case) and existing instruction $CA_1$ (0x1ff (000111111111) in this case) each of that as the instruction consists of the same-value bits, respectively, to the extension-operation-executing unit 12B and the existing-operation-executing unit 12A.

As a result of this, in the extension-operation-executing unit 12B, the operation (the integer multiplication) is executed according to the extension instruction $CB_1$. In parallel with this, in the existing-operation-executing unit 12A, the operation (the integer addition) is executed according to the existing instruction $CA_1$. In parallel with these operation processes, in step SA10, the control circuit 11 performs the instruction-type determination according to the "9" bits ("0" in this case) of the operation code (0x1ff (000111111111) that has been so converted by the instruction decoder 10. In this case, because the values of the "9" bits are all "0", the control circuit 11 determines the type of the instruction to be the existing instruction.

In step SA6, the existing-operation-executing unit 12A determines whether the operation has ended. In this case, assuming that the result of the determination is "No", that determination is repeatedly performed. And upon completion of the operation, the existing-operation-executing unit 12A, after the determination result in step SA6 is made to be "Yes", in step SA7, outputs the operation-termination-notifying signal $DN_1$ to the control circuit 11. In the next step SA8, the existing-operation-executing unit 12A outputs the existing-instruction operated-result data $EA_1$ to the multiplexer 13. On the other hand, at the same time as the operation of the existing-operation-executing unit 12A ends, the operation of the extension-operation-executing unit 12B also ends. Therefore, in step SA4, the extension-operation-executing unit 12B outputs the extension-instruction operated-result data $EB_1$ to the multiplexer 13.

Upon input of the operation-termination-notifying signal DN1, the control circuit 11 recognizes that the respective operations of the existing-operation-executing unit 12A and the extension-operation-executing unit 12B have ended to thereby execute a processing of step SA9. Namely, in step SA9, the control circuit 11, upon receipt of the determined result of the instruction in step SA10, outputs either one of the selecting signal $SELA_1$ or $SELB_1$ to the multiplexer 13. In this case, because the operation code "9" has a value of "0", i.e., the type of the instruction is the existing instruction, the control circuit 11 outputs the selecting signal $SELA_1$ to the multiplexer 13. As a result of this, in the multiplexer 13, the existing-instruction operated-result data $EA_1$ is selected and this existing-instruction operated-result data $EA_1$ is stored in a register 14.

On the other hand, when in the step SA1 the 32-bit extension instruction (0x5c5c5c5c) is issued, in step SA2 the instruction decoder 10 converts the extension instruction (0x5c5c5c5c) into the 12-bit operation code (0x3ff (001111111111)). Thereafter, the instruction decoder 10 notifies the thus-converted data to the control circuit 11. As a result of this, in step SA3 and step SA5, the control circuit 11 notifies the extension instruction $CB_1$ (0x3ff (001111111111) in this case) and existing instruction CA, (0x3ff (001111111111) in this case) each of that as the instruction consists of the same-value bits, respectively, to the extension-operation-executing unit 12B and the existing-operation-executing unit 12A.

As a result of this, in the extension-operation-executing unit 12B, the operation (the integer multiplication) is executed according to the extension instruction $CB_1$. In parallel with this, in the existing-operation-executing unit 12A, the operation (the integer addition) is executed according to the existing instruction $CA_1$. In parallel with these operation processes, in step SA10, the control circuit 11 performs the instruction-type determination according to the "9" bits ("1" in this case) of the operation code (0x3ff (001111111111) that has been so converted by the instruction decoder 10. In this case, because the values of the "9" bits are all "1", the control circuit 11 determines the type of the instruction to be the extension instruction.

In step SA6, the existing-operation-executing unit 12A determines whether the operation has ended. In this case, assuming that the result of the determination is "No", that determination is repeatedly performed. And upon completion of the operation, the existing-operation-executing unit 12A, after the determination result in step SA6 is made to be "Yes", in step SA7, outputs the operation-termination-notifying signal $DN_1$ to the control circuit 11. In the next step SA8, the existing-operation-executing unit 12A outputs the existing-instruction operated-result data $EA_1$ to the multiplexer 13. In parallel with this, in step SA4, the extension-operation-executing unit 12B outputs the extension-instruction operated-result data $EB_1$ to the multiplexer 13.

Upon input of the operation-termination-notifying signal $DN_1$, in step SA9, because the operation code "9" has a value of "1", i.e., the type of the instruction is the extension instruction, the control circuit 11 outputs the selecting signal $SELB_1$ to the multiplexer 13. As a result of this, in the multiplexer 13, the extension-instruction operated-result data $EB_1$ is selected and this extension-instruction operated-result data $EB_1$ is stored in a register 14.

As has been described above, according to the first embodiment, the operation code is made to contain the instruction-type-determining bits. Thereby, even when the extension instruction has been issued, utilizing the operation-termination-notifying signal $DN_1$ output from the existing-operation-executing unit 12A, the termination of the operation of the extension-operation-executing unit 12B is recognized to thereby select the extension-instruction-operated-result data $EB_1$ of the extension-operation-executing unit 12B. Therefore, it is possible to add the extension instruction to the existing mechanism with a minimum necessary change in design made with respect thereto, with the request that the cost can be reduced.

Figure 3:
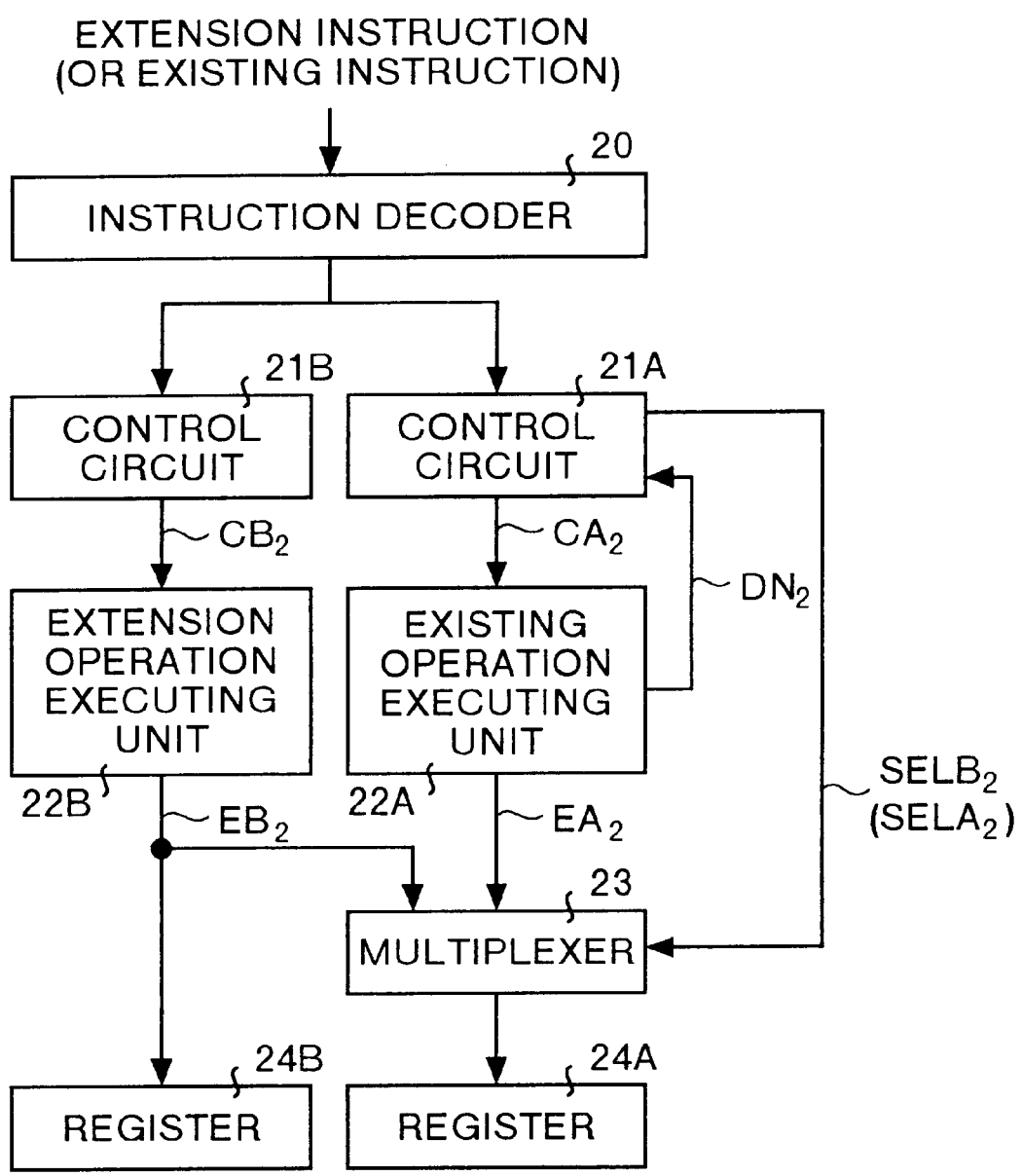
FIG. 3 is a block diagram illustrating the construction of a second embodiment of the present invention.

FIG. 3 is a block diagram illustrating the construction of a second embodiment of the present invention. In this figure, illustration is made of the construction of a main part of the operation-processing apparatus after the extension instruction is added to the existing instruction according to the request made by customizing. Here, the existing instruction is, for example, an integer-addition instruction while the extension instruction is, for example, a floating-point-numeric-value-multiplication instruction. This extension instruction is a specific instruction for causing a different type of operated-result data (in this case an extension-instruction operated-result data $EB_2$) to be stored into a register 24A.

Each of these existing instruction and extension instruction, in the same way as in the first embodiment, consists of an instruction code composed of 32 bits, and both of them are each expressed as follows when so done in the form of a hexadecimal representation.

Existing instruction: 0x8a8a8a8a

Extension instruction: 0x5c5c5c5c

The instruction decoder 20 decodes the 32-bit existing instruction and the 32-bit extension instruction into 12-bit operation codes (the existing instruction $CA_2$ and extension instruction $CB_2$) in the same way as the instruction decoder 10 (see FIG. 1) did. These existing instruction $CA_2$ and extension instruction $CB_2$ are respectively expressed as follows when so done in the form of a hexadecimal representation (binary representation).

Existing instruction $CA_2$: 0x1ff (000111111111)

Extension instruction $CB_2$: 0x3ff (001111111111)

The bits constituting each of these existing instruction $CA_2$ and extension instruction $CB_2$ that are actually effective as the instructions are "11:10, 8:0" in the same way as in the first embodiment. From this, because the "11:10, 8:0" bits constituting each of these existing instruction $CA_2$ and extension instruction $CB_2$ each have the same value, the existing instruction $CA_2$ and extension instruction $CB_2$ are the ones the bit constructions of that are the same. Also, the "9" bits of each of the existing instruction $CA_2$ and extension instruction $CB_2$ are dummy bits that are not used as the bits for use for the instruction.

However, in the second embodiment, those "9" bits are operated-result-data-type-determining bits for determining the type (in this case an integer or a floating-point numeric-value) of the operated-result data (the existing-instruction operated-result data $EA_2$ or extension-instruction operated-result data $EB_2$) that is to be stored into the register 24A (in this case the integer register) Namely, when the "9" bits each have a value of "0", this means that the type of the operated-result data (in this case the existing-instruction operated-result data $EA_2$) to be stored into the register 24A is an integer. On the other hand, when the "9" bits each have a value of "1", this means that the type of the operated-result data (in this case the extension-instruction operated-result data $EB_2$) to be stored into the register 24A is a floating-point numeric value.

The control circuit 21A controls the notification of the existing instruction $CA_2$ with respect to the existing-operation-executing unit 22A and the storage of the operated-result data into the register 24A. The existing-operation-executing unit 22A is an existing-operation-executing unit, which according to the existing instruction $CA_2$ executes integer addition and outputs the operation-termination-notifying signal $DN_2$ indicating the effect that the operation has ended to the control circuit 21A. Also, the existing-operation-executing unit 22A outputs the operated result as the existing-instruction operated-result data $EA_2$.

The multiplexer 23 selects either one of the existing-instruction operated-result data $EA_2$ and the extension-instruction operated-result data $EB_2$ according to the control of the control circuit 21A and outputs this selected data to the register 24A. Specifically, when the selecting signal $SELA_2$ has been input from the control circuit 21A, the multiplexer 23 outputs the existing-instruction operated-result data $EA_2$ to the register 24A.

On the other hand, when the selecting signal $SELB_2$ has been input from the control circuit 21A, the multiplexer 23 outputs the extension-instruction operated-result data $EB_2$ to the register 24A. The register 24A is, for example, an integer register, which temporarily stores therein the existing-instruction operated-result data $EA_2$ or the extension-instruction operated-result data $EB_2$. What is to be noted here is that the existing-instruction operated-result data $EA_2$ the type of that is an integer or the extension-instruction operated-result data $EB_2$ the type of that is a floating point numeric value is stored in the register 24A.

The control circuit 21B controls the notification of the extension instruction $CB_2$ with respect to the extension-operation-executing unit 22B and the outputting of the extension-instruction operated-result data $EB_2$ with respect to the register 24B. The extension-operation-executing unit 22B executes floating-point numeric-value multiplication by the request made by customizing according to the extension instruction $CB_2$. The extension-operation-executing unit 22B outputs the operated result as the extension-instruction operated-result data $EB_2$. Here, the number of the operation-termination cycles of the existing-operation-executing unit 22A and the number of the operation-termination cycles of the extension-operation-executing unit 22B are made to be the same.

It is to be noted here that no signal corresponding to the operation-termination-notifying signal $DN_2$ is output from the extension-operation-executing unit 22B. It is also to be noted that the type (an integer in this case) of the existing-instruction operated-result data $EA_2$ and the type (a floating-point numeric value in this case) of the extension-instruction operated-result data $EB_2$ are different from each other. The register 24B is a floating-point numeric-value register, which temporarily stores therein the extension-instruction operated-result data $EB_2$. Provided, however, that according to the conditions as later described the extension-instruction operated-result data $EB_2$ is not stored in the register 24B.

Figure 4:
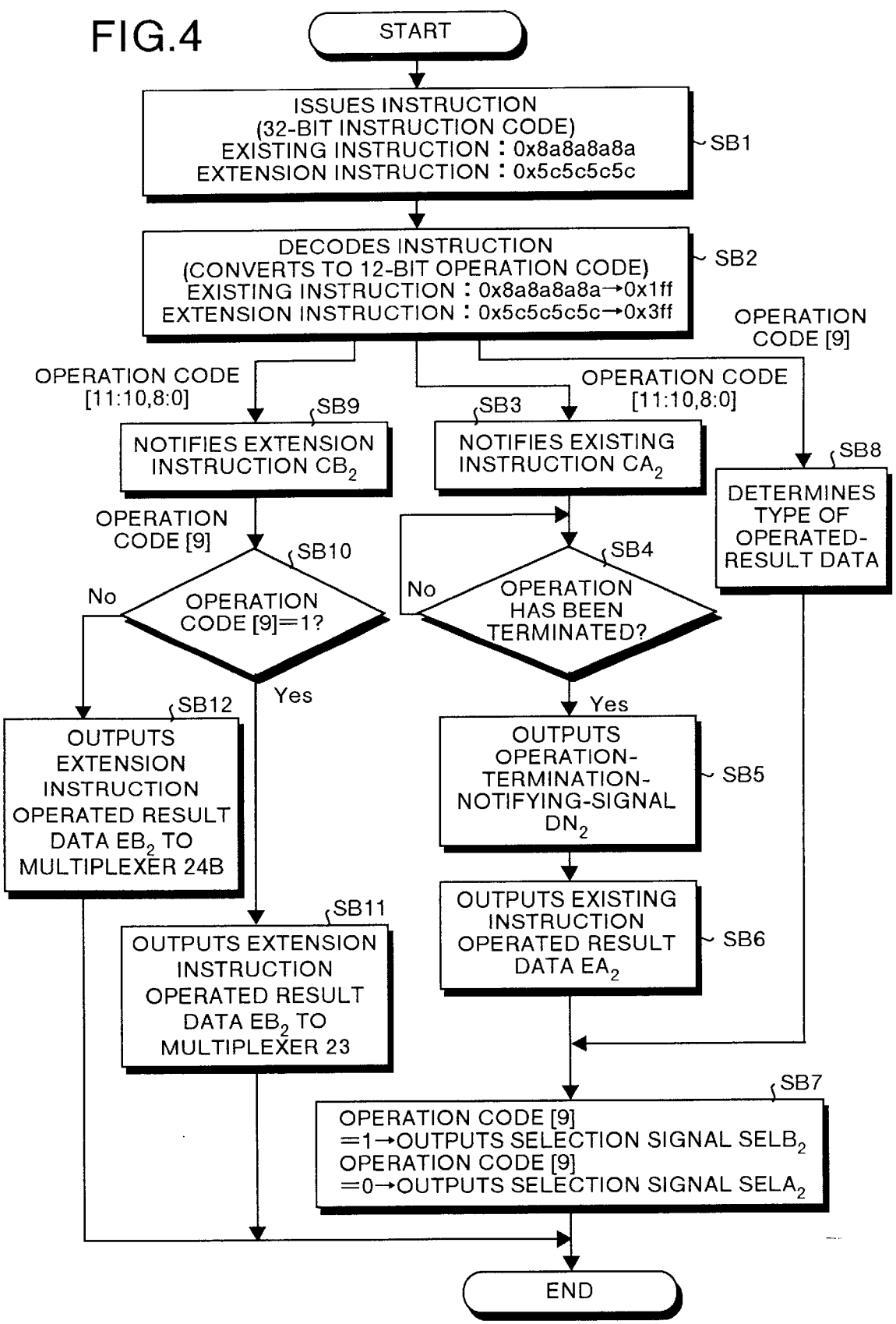
FIG. 4 is a flow chart illustrating the operation of the second embodiment.

Next, the operation of the above-described second embodiment will be explained with reference to a flow chart illustrated in FIG. 4. When in a step SB1 illustrated in this figure the 32-bit existing instruction (0x8a8a8a8a) is issued, in step SB2 the instruction decoder 20 converts the existing instruction (0x8a8a8a8a) into the 12-bit operation code (0x1ff (000111111111)). Thereafter, the instruction decoder 10 notifies the thus-converted data to the control circuit 21A and the control circuit 21B.

As a result of this, in step SB3, the control circuit 21A notifies the existing-instruction $CA_2$(0x1ff (000111111111) in this case) to the existing-operation-executing unit 22A. In parallel with this notifying operation, in step SB9, the control circuit 21B notifies the extension instruction $CB_2$ (0x1ff (000111111111 in this case) to the extension-operation-executing unit 22B.

As a result of this, in the existing-operation-executing unit 22A, the operation (the integer addition) is executed according to the existing instruction $CA_2$. In parallel with this addition operation, in the extension-operation-executing unit 22B, the operation (the floating-point numeric value multiplication) is executed according to the extension instruction $CB_2$. In parallel with these operation processes, in step SB8, the control circuit 21A performs the operated-result data-type determination, the operated result of that is to be stored in the register 24A, according to the "9" bits ("0" in this case) of the operation code (0x1ff (000111111111)) that has been so converted by the instruction decoder 20. In this case, because the values of the "9" bits are all "0", the control circuit 21A determines the type of the operated-result data to be the integer.

In step SB4, the existing-operation-executing unit 22A determines whether the operation has ended. In this case, assuming that the result of the determination is "No", that determination is repeatedly performed. And upon completion of the operation, the existing-operation-executing unit 22A, after the determination result in step SB4 is made to be "Yes", in step SB5, outputs the operation-termination-notifying signal $DN_2$ to the control circuit 21A. In the next step SB6, the existing-operation-executing unit 22A outputs the existing-instruction operated-result data $EA_2$ to the multiplexer 23.

On the other hand, in step SB10, the control circuit 21B determines whether the "9" bits of the operation code (0x1ff (000111111111)) so converted by the instruction decoder 20 each have a value of "1". In this case, because the "9" bits each have a value of "0", the control circuit 21B makes the determination result in step SB10 "No". Also, at the same time as the operation of the existing-operation-executing unit 22A ends, the operation of the extension-operation-executing unit 22B also ends. Therefore, in step SB12, the extension 28 operation-executing unit 22B outputs the extension-instruction operated-result data $EB_2$ to the multiplexer 24B.

Upon input of the operation-termination-notifying signal $DN_2$, the control circuit 21A recognizes that the respective operations of the existing-operation-executing unit 22A and the extension-operation-executing unit 22B have ended to thereby execute a processing of step SB7. Namely, in step SB7, the control circuit 21A, upon receipt of the determined result of the type in step SB8, outputs either one of the selecting signals $SELA_2$ and $SELB_2$ to the multiplexer 23. In this case, because the operation code "9" has a value of "0", i.e., the type of the operated-result data to be stored into the register 24A is the integer, the control circuit 21A outputs the selecting signal $SELA_2$ to the multiplexer 23. As a result of this, in the multiplexer 23, the existing-instruction operated-result data $EA_2$ is selected and this existing-instruction operated-result data $EA_2$ is stored in the register 24A.

On the other hand, when in the step SB1 the 32-bit extension instruction (0x5c5c5c5c) is issued, in step SB2 the instruction decoder 20 converts the extension instruction (0x5c5c5c5c) into the 12-bit operation code (0x3ff (001111111111)). Thereafter, the instruction decoder 20 notifies the thus-converted data to the control circuit 21A and control circuit 21B.

As a result of this, in step SB3, the control circuit 21A notifies the existing-instruction $CA_2$ (0x3ff (001111111111 in this case)) to the existing-operation-executing unit 22A. In parallel with this notifying operation, in step SB9, the control circuit 21B notifies the extension instruction $CB_2$ (0x3ff (001111111111 in this case)) to the extension-operation-executing unit 22B.

As a result of this, in the existing-operation-executing unit 22A, the operation (the integer addition) is executed according to the existing instruction $CA_2$ in the same way as in the case of the above-described operation. In parallel with this, in the extension-operation-executing unit 22B, the operation (the floating-point numeric value multiplication) is executed according to the extension instruction $CB_2$. In parallel with these operation pieces of processing, in step SB8, the control circuit 21A performs the operated-result-data-type determination to be stored in the register 24A according to the "9" bits ("1" in this case) of the operation code (0x3ff (001111111111) that has been so converted by the instruction decoder 20. In this case, because the values of the "9" bits are all "1", the control circuit 21A determines the type of the operated-result data to be the floating-point numeric value.

In step SB4, the existing-operation-executing unit 22A determines whether the operation has ended. In this case, assuming that the result of the determination is "No", that determination is repeatedly performed. And upon completion of the operation, the existing-operation-executing unit 22A, after the determination result in step SB4 is made to be "Yes", in step SB5, outputs the operation-termination-notifying signal $DN_2$ to the control circuit 21A. In the next step SB6, the existing-operation-executing unit 22A outputs the existing-instruction operated-result data $EA_2$ to the multiplexer 23.

On the other hand, in step SB10, the control circuit 21B determines whether the "9" bits of the operation code (0x3ff (001111111111)) so converted by the instruction decoder 20 each have a value of "1". In this case, because the "9" bits each have a value of "1", the control circuit 21B makes the determination result in step SB10 "Yes". Also, at the same time as the operation of the existing-operation-executing unit 22A ends, the operation of the extension-operation-executing unit 22B also ends. Therefore, in step SB11, the extension-operation-executing unit 22B outputs the extension-instruction operated-result data $EB_2$ to the multiplexer 23. Here, the extension-operation-executing unit 22B is prevented from outputting the extension-instruction operated-result data $EB_2$ to the register 24B under the control of the control circuit 21B.

Upon input of the operation-termination-notifying signal $DN_2$, the control circuit 21A recognizes that the respective operations of the existing-operation-executing unit 22A and the extension-operation-executing unit 22B have ended to thereby execute the processing of step SB7. Namely, in step SB7, the control circuit 21A, upon receipt of the determined result of the type in step SB8, outputs either one of the selecting signals $SELA_2$ and $SELB_2$ to the multiplexer 23.

In this case, because the operation code "9" has a value of "1", i.e., the type of the operated-result data to be stored into the register 24A is the floating-point numeric value, the control circuit 21A outputs the selecting signal $SELB_2$ to the multiplexer 23. As a result of this, in the multiplexer 23, the extension-instruction operated-result data $EB_2$ is selected and this existing-instruction operated-result data $EB_2$ is stored in the register 24A.

As has been described above, according to the second embodiment, according to the type-determining bits contained in the operation code, the existing-instruction operated-result data $EB_2$ of the extension-operation-executing unit 22B is forwarded to the register 24A. Therefore, it is possible to add the extension instruction to the existing mechanism with a minimum necessary change in design made with respect thereto.

Now, in the above-described second embodiment, an explanation has been given of an example where the number of the operation termination cycles of the existing-operation-executing unit 22A illustrated in FIG. 3 and the number of the operation termination cycles of the extension-operation-executing unit 22B also illustrated in that figure are the same in value, i.e., the existing-operation-executing unit 22A and the extension-operation-executing unit 22B are operationally synchronized with each other. However, the invention may be applied to a case where the both units 22A and 22B are operationally asynchronous to each other. In the following description, an explanation is given of such a case as a third embodiment.

Figure 5:
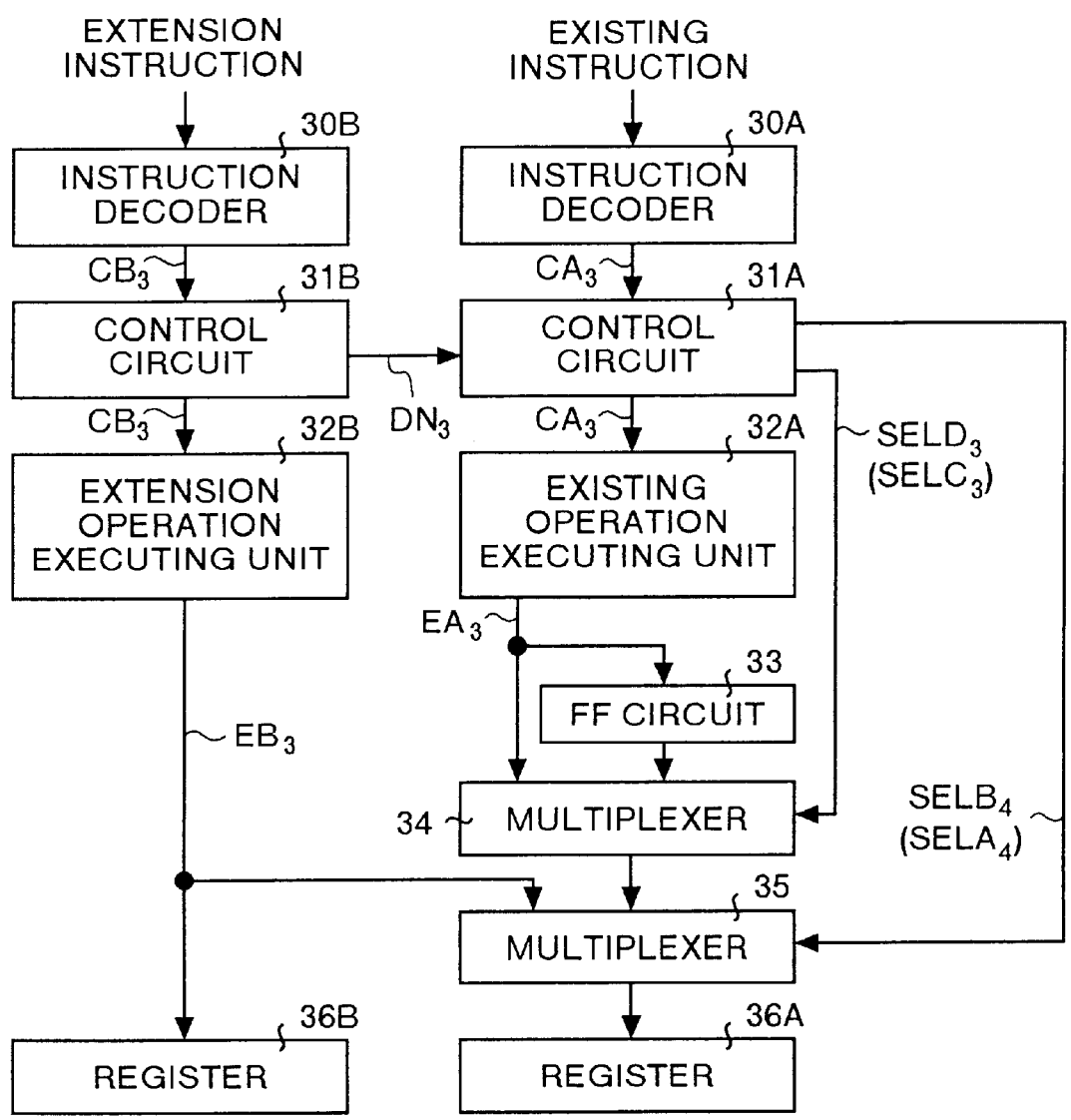
FIG. 5 is a block diagram illustrating the construction of a third embodiment of the present invention.

FIG. 5 is a block diagram illustrating the construction of a third embodiment of the present invention. In this figure, illustration is made of the construction of a main part of the operation-processing apparatus after the extension instruction is added to the existing instruction according to the request made by customizing. Here, the existing instruction is, for example, an integer-addition instruction while the extension instruction is, for example, a floating-point-numeric-value-multiplication instruction. This extension instruction is a specific instruction for causing a different type of operated-result data (in this case an extension-instruction operated-result data $EB_3$) to be stored into a register 36A in the same way as in the second embodiment.

Each of these existing instruction and extension instruction, in the same way as in the second embodiment, consists of an instruction code composed of 32 bits, and both of them are respectively expressed as follows when so done in the form of a hexadecimal representation.

Existing instruction: 0x8a8a8a8a

Extension instruction: 0x5c5c5c5c

The instruction decoder 30A decodes the 32-bit existing instruction into a 12-bit operation code (the existing instruction $CA_3$). On the other hand, the instruction decoder 30B decodes the 32-bit extension instruction into a 12-bit operation code (the extension instruction $CB_3$). These existing instruction $CA_3$ and extension instruction $CB_3$ are respectively expressed as follows when so done in the form of a hexadecimal representation (binary representation).

Existing instruction $CA_3$: 0x1ff (000111111111)

Extension instruction $CB_3$: 0x3ff (001111111111)

The bits constituting each of these existing instruction $CA_3$ and extension instruction $CB_3$ that are actually effective as the instructions are "11:10, 8:0". The "9" bits of each of the existing instruction $CA_3$ and extension instruction $CB_3$ are dummy bits that are not used as the bits for use for the instruction. However, in the third embodiment, those "9" bits are operated-result-data-type-determining bits for determining the type (in this case an integer or a floating-point numeric-value) of the operated-result data (the existing-instruction operated-result data $EA_3$ or extension-instruction operated-result data $EB_3$) that is to be stored into the register 36A (in this case the integer register) Namely, when the "9" bits each have a value of "0", this means that the type of the operated-result data (in this case the existing-instruction operated-result data $EA_3$) to be stored into the register 36A is an integer. On the other hand, when the "9" bits each have a value of "1", this means that the type of the operated-result data (in this case the extension-instruction operated-result data $EB_3$) to be stored into the register 36A is a floating-point numeric value.

The control circuit 31A controls the notification of the existing instruction $CA_3$ with respect to the existing-operation-executing unit 32A and the storage of the operated-result data into the register 36A. The existing-operation-executing unit 32A is an existing-operation-executing unit, which according to the existing instruction $CA_3$ executes integer addition and outputs the operated-result data as the existing-instruction operated-result data $EA_3$.

An FF (flip-flop) circuit 33 temporarily stores the existing-instruction operated-result data $EA_3$. The multiplexer 34 selects either one of the existing-instruction operated-result data $EA_3$, which has been directly output from the existing-operation-executing unit 32A, and the existing-instruction operated-result data $EA_3$, which is stored in the FF circuit 33, according to the control of the control circuit 31A and outputs this selected data to the multiplexer 35.

Specifically, when the selecting signal $SELD_3$ has been input from the control circuit 31A, the multiplexer 34 selects the existing-instruction operated-result data $EA_3$ that has been directly output from the existing-operation-executing unit 32A. On the other hand, when the selecting signal $SELC_3$ has been input from the control circuit 31A, the multiplexer 34 selects the existing-instruction operated-result data $EA_3$ that is stored in the FF circuit 33.

The multiplexer 35 selects either one of the existing-instruction operated-result data $EA_3$ and the extension-instruction operated-result data $EB_3$ according to the control of the control circuit 31A and outputs this selected data to the register 36A. Specifically, when the selecting signal $SELA_4$ has been input from the control circuit 31A, the multiplexer 35 outputs the existing-instruction operated-result data $EA_3$ to the register 36A.

On the other hand, when the selecting signal $SELB_4$ has been input from the control circuit 31A, the multiplexer 35 outputs the extension-instruction operated-result data $EB_3$ to the register 36A. The register 36A is, for example, an integer register, which temporarily stores therein the existing-instruction operated-result data $EA_3$ or the extension-instruction operated-result data $EB_3$. What is to be noted here is that the existing-instruction operated-result data $EA_3$, the type of that is an integer, or the extension-instruction operated-result data $EB_3$, the type of that is a floating point numeric value, is stored in the register 36A.

The control circuit 31B controls the notification of the extension instruction $CB_3$ with respect to the extension-operation-executing unit 32B and the storage of the extension-instruction operated-result data $EB_3$ with respect to the register 36B. The control circuit 31B outputs to the control circuit 31A the operation-termination-notifying signal $DN_3$ indicating the effect that the operation of the extension-operation-executing unit 32B has ended. The extension-operation-executing unit 32B executes floating-point numeric-value multiplication by the request made by customizing according to the extension instruction $CB_3$. The extension-operation-executing unit 32B outputs the operated result as the extension-instruction operated-result data $EB_3$.

Here, the number of the operation-termination cycles of the existing-operation-executing unit 32A and the number of the operation-termination cycles of the extension-operation-executing unit 32B are different from each other. Namely, the existing-operation-executing unit 32A and the extension-operation-executing unit 32B are made operationally asynchronous to each other. The register 36B is a floating-point numeric-value register, which temporarily stores therein the extension-instruction operated-result data $EB_3$. Provided, however, that according to the conditions as later described the extension-instruction operated-result data $EB_3$ is not stored in the register 36B.

Next, the operation of the above-described third embodiment will be explained with reference to flow charts illustrated in FIGS. 6(a) and 6(b) as well as in FIG. 7. FIG. 6(a) is a flow chart illustrating the operation of the control circuit 31B side illustrated in FIG. 5 while FIG. 6(b) is a flow chart illustrating the operation of the control circuit 31A side. Also, FIG. 7 is a flow chart illustrating the operation of the control circuit 31A illustrated in FIG. 5.

When in a step SD1 illustrated in FIG. 6(b) the 32-bit existing instruction (0x8a8a8a8a) is issued, in step SD2 the instruction decoder 30A converts the existing instruction (0x8a8a8a8a) into the 12-bit operation code (0x1ff (000111111111)). Thereafter, the instruction decoder 30A notifies the thus-converted data to the control circuit 31A.

As a result of this, in step SD3, the control circuit 31A notifies the existing instruction $CA_3$ to the existing-operation-executing unit 32A. As a result of this, in the existing-operation-executing unit 32A, the operation (the integer addition) is executed according to the existing instruction $CA_3$. In step SD4, the existing-operation-executing unit 32A determines whether the operation has ended. In this case, assuming that the result of this determination is "No", this determination is repeatedly performed. And upon completion of the operation, the existing-operation-executing unit 32A, after the determination result in step SD4 is made to be "Yes", in step SD5, outputs the existing-instruction operated-result data $EA_3$. Resultantly, the existing-instruction operated-result data $EA_3$ is directly output to the multiplexer 34 and is also stored into the FF circuit 33.

On the other hand, in step SE1 illustrated in FIG. 7, the control circuit 31A determines whether the operation-termination-notifying signal $DN_3$ has been input from the control circuit 31B. In this case, it is assumed that the result of the determination result be made to be "No". In step SE6, the control circuit 31A outputs the selecting signal $SELD_3$ to the multiplexer 34 and also outputs the selecting signal $SELA_4$ to the multiplexer 35. As a result of this, in the multiplexer 34, the existing-instruction operated-result data $EA_3$ that has been directly output from the existing-operation-executing-unit 32A is selected. In the multiplexer 35, the existing-instruction operated-result data $EA_3$ from the multiplexer 34 is selected. This existing-instruction operated-result data $EA_3$ is stored in the register 36A.

Also, when in the step SC1 illustrated in FIG. 6(a) the 32-bit extension instruction (0x5c5c5c5c) is issued, in step SC2 the instruction decoder 30B converts the extension instruction (0x5c5c5c5c) into the 12-bit operation code (0x3ff (001111111111)). Thereafter, the instruction decoder 30B notifies the thus-converted data to the control circuit 31B. In step SC3, the control circuit 31B notifies the extension instruction $CB_3$ (0x3ff (001111111111 in this case)) to the extension-operation-executing unit 32B. As a result of this, in the extension-operation-executing unit 32B, the operation (the floating-point numeric-value multiplication) is executed according to the extension instruction $CB_3$.

In step SC4, the control circuit 31B determines the number of the operation termination cycles in the extension-operation-executing unit 32B according to the extension instruction $CB_3$. In step SC5, the control circuit 31B determines whether the operation of the extension-operation-executing unit 32B has ended, according to the thus-determined number of the operation termination cycles. In this case, assuming that the result of the determination is "No", that determination is repeatedly performed. And upon completion of the operation of the extension-operation-executing unit 32B, the control circuit 31B makes the determination result in step SC5 "Yes". And, in step SC6, the control circuit 31B outputs the operation-termination-notifying signal $DN_3$ to the control circuit 31A.

In step SC7, the control circuit 31B determines whether the "9" bits of the operation code (0x3ff (001111111111)) so converted by the instruction decoder 30B each have a value of "1". Namely, the control circuit 31B determines the type of the operated-result data to be stored into the register 36A according to the "9" bits (in this case "1").

In this case, because the "9" bits each have a value of "1", the control circuit 31B determines that type to be an integer and makes the determination result in step SC7 "Yes". In step SC8, the extension-operation-executing unit 32B outputs the extension-instruction operated-result data $EB_3$ to the multiplexer 35. In this case, the extension-operation-executing unit 32B is prevented from outputting the extension-instruction operated-result data $EB_3$ to the register 36B under the control of the control circuit 31B.

Upon input of the operation-termination-notifying signal $DN_3$ to it, the control circuit 31A makes the determined result of step SE1 illustrated in FIG. 7 "Yes". In step SE2, the control circuit 31A determines whether outputting the existing-instruction operated-result data $EA_3$, in other words whether terminating the operation of the existing-operation-executing unit 32A. Here, when no operation is executed in the existing-operation-executing unit 32A, or in case that even when the operation is being executed therein the timing is not the operation termination timing, the control circuit 31A makes the determination result in step SE2 "No" and outputs the selecting signal $SELB_4$ to the multiplexer 35. As a result of this, the extension-instruction operated-result data $EB_3$ is selected by the multiplexer 35, and this extension-instruction operated-result data $EB_3$ is stored into the register 36A.

On the other hand, in case that the determination result in step SE2 is "Yes", namely the operation of the existing-operation-executing unit 32A ends, in step SE3, the control circuit 31A waits for a prescribed period of time. Upon completion of the operation, the existing-instruction operated-result data $EA_3$ from the existing-operation-executing unit 32A is directly output to the multiplexer 34 and also is stored into the FF circuit 33.

And, when a prescribed period of time lapses, in step SE4 the control circuit 31A outputs the selecting signal $SELC_3$ to the multiplexer 34 and also outputs the selecting signal $SELA_4$ to the multiplexer 35. As a result of this, in the multiplexer 34, the existing-instruction operated-result data $EA_3$ stored in the FF circuit 33 is selected while, in the multiplexer 35, the existing-instruction operated-result data $EA_3$ from the multiplexer 34 is selected. This existing-instruction operated-result data $EA_3$ is stored into the register 36A. In this way, the control circuit 31A performs mediation between the storage timing of the existing-instruction operated-result data $EA_3$ with respect to the register 36A and the storage timing of the extension-instruction operated-result data $EB_3$ with respect thereto.

Also, in case that in the step SC7 illustrated in FIG. 6(a) the values of the "9" bits are each "0", the control circuit 31B makes the determination result "No". In step SC9, the extension-operation-executing unit 32B outputs the extension-instruction operated-result data $EB_3$ to the register 36B. As a result of this, the extension-instruction operated-result data $EB_3$ is stored into the register 36B.

As has been described above, according to the third embodiment, the operation-termination-notifying signal $DN_3$ regarding the extension-operation-executing unit 32B is output and, according to the type-determining bits contained in the operation code, the extension-instruction operated-result data $EB_3$ of the extension-operation-executing unit 32B is forwarded to the register 36A. Therefore, even when the extension-operation-executing unit 32B and the existing-operation-executing unit 32A asynchronously operate, it is possible to add the extension instruction to the existing mechanism with a minimum necessary change in design made with respect thereto.

Also, according to the third embodiment, it has been arranged to perform mediation between the outputting timing of the existing-instruction operated-result data $EA_3$ with respect to the register 36A and the forwarding timing of the extension-instruction operated-result data $EB_3$ with respect thereto. Therefore, it is possible to prevent the batting, which would occur with the same timing, from occurring.

Figure 8:
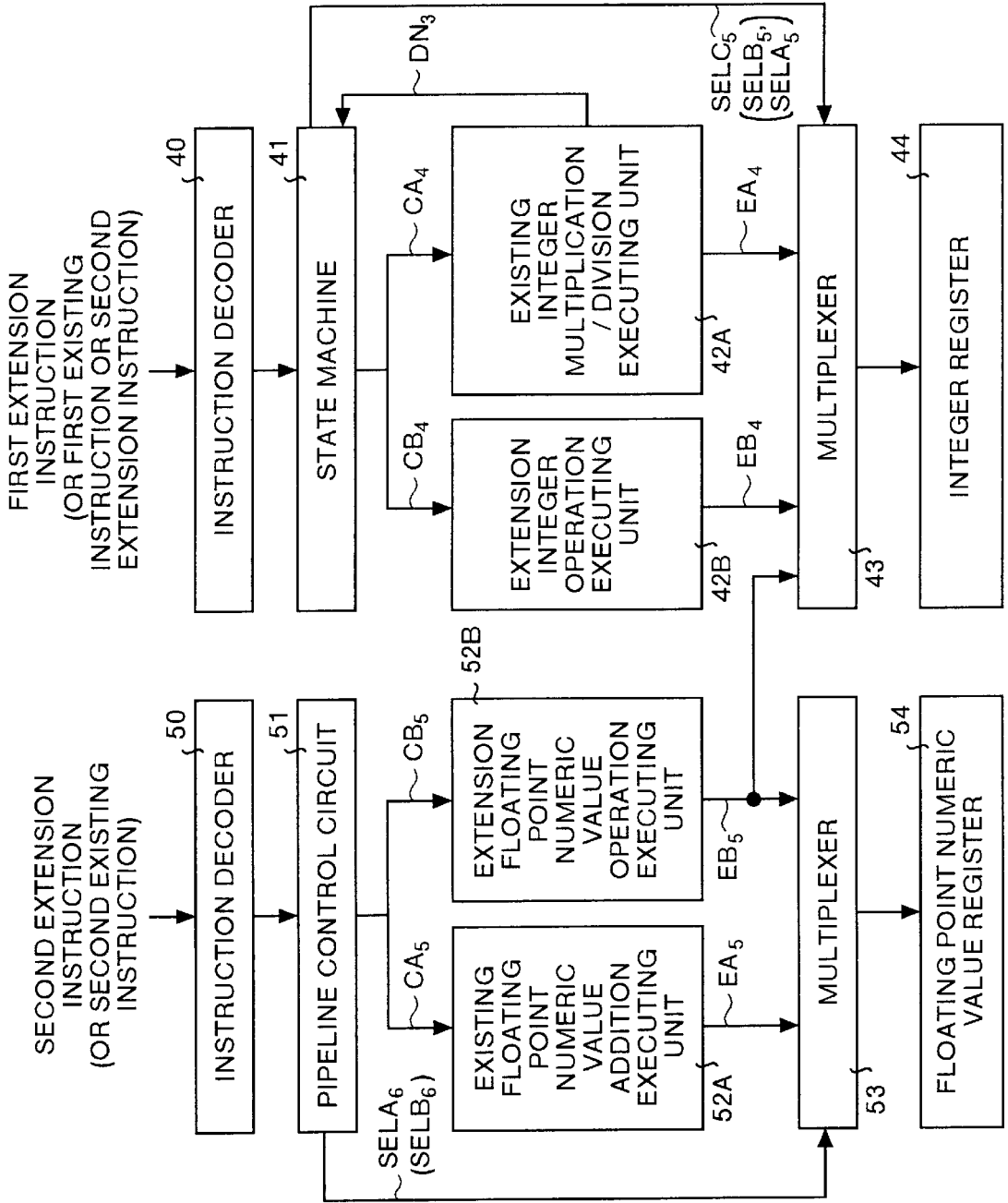
FIG. 8 is a block diagram illustrating the construction of a fourth embodiment of the present invention.

FIG. 8 is a block diagram illustrating the construction of a fourth embodiment of the present invention. In this figure, illustration is made of the construction of a main part of the operation-processing apparatus after the first and the second extension instruction are added to the first and the second existing instruction according to the request made by customizing. Here, the first existing instruction is an integer/division instruction while the first extension instruction is an integer operation instruction. Also, the second existing instruction is a floating-point-numeric-value addition instruction while the second extension instruction is a floating-point-numeric-value multiplication instruction. This second extension instruction is a specific instruction for causing a different type of operated-result data (in this case an extension-instruction operated-result data $EB_5$) to be stored into an integer register 44 in the same way as in the second embodiment.

Each of these first and second existing instructions and first and second extension instructions, in the same way as in the first embodiment, consists of an instruction code composed of 32 bits, and each of them is expressed as follows when so done in the form of a hexadecimal representation.

First existing instruction: 0x12121212
First extension instruction: 0x87878787
Second existing instruction: 0x8a8a8a8a
Second extension instruction: 0x5c5c5c5c The instruction decoder 40 decodes the 32-bit first existing instruction and 32-bit first extension instruction into 12-bit operation codes (the existing instruction $CA_4$ and the extension instruction $CB_4$) These existing instruction $CA_4$ and extension instruction $CB_4$ are respectively expressed as follows when so done each in the form of a hexadecimal representation (binary representation).

Existing instruction $CA_4$: 0x0aa (000010101010)
Extension instruction $CB_4$: 0x8aa (100010101010)

The bits constituting each of these existing instruction $CA_4$ and extension instruction $CB_4$ that are actually effective as the instructions are "10:0" bits. For this reason, because the respective "10:0" bits of the existing instruction $CA_4$ and extension instruction $CB_4$ each have the same value, each of these instructions is an instruction that has the same bit construction. Also, the respective 11 bits of the existing instruction $CA_4$ and extension instruction $CB_4$ are dummy bits that are not used as the bits for use for the instruction.

However, in the fourth embodiment, those 11 bits are instruction-type-determining bits for determining the type of the existing instruction $CA_4$ and the extension instruction $CB_4$. Namely, when the 11 bits each have a value of "0", the type of the instruction is the first existing instruction while when the 11 bits each have a value of "1", the type of the instruction is the first extension instruction. Further, the instruction decoder 40 decodes the second extension instruction.

A state machine 41 controls the notification of the existing instruction $CA_4$ and extension instruction $CB_4$ with respect to the existing integer-multiplication/division-executing unit 42A and extension integer-operation-executing unit 42B and the storage of the operated-result data into the integer register 44. The existing integer-multiplication/division-executing unit 42A is an existing-operation-executing unit. According to the existing instruction $CA_4$, that unit executes integer multiplication/division, and outputs to the state machine 41 the operation-termination-notifying signal $DN_3$ indicating the effect that the operation has ended. Also, the existing integer-multiplication/division-executing unit 42A outputs the operated-result data as the existing-instruction operated-result data $EA_4$.

The extension integer-operation-executing unit 42B is the unit that has been added to the existing mechanism according to the request made by customizing and executes integer operation according to the extension instruction $CB_4$. This extension integer-operation-executing unit 42B outputs the operated-result data as the extension-instruction operated-result data $EB_4$. Here, the number of the operation-termination cycles of the existing integer-multiplication/division-executing unit 42A and the number of the operation-termination cycles of the extension integer-operation-executing unit 42B are the same in value. What is to be noted here is that no signal corresponding to the operation-termination-notifying signal $DN_3$ is output from the extension integer-operation-executing unit 42B. Also, the type (an integer in this case) of the existing-instruction operated-result data $EA_4$ and the type (an integer in this case) of the extension-instruction operated-result data $EB_4$ are made to be the same in type.

The multiplexer 43 selects one of the existing-instruction operated-result data $EA_4$, the extension-instruction operated-result data $EB_4$ and the extension-instruction operated-result data $EB_5$ according to the control of the state machine 41, and outputs this selected data to the integer register 44. Specifically, when the selecting signal $SELA_5$ has been input from the state machine 41, the multiplexer 43 outputs the existing-instruction operated-result data $EA_4$ to the integer register 44.

Also, when the selecting signal $SELB_5$ has been input from the state machine 41, the multiplexer 43 outputs the extension-instruction operated-result data $EB_4$ to the integer register 44. Further, when the selecting signal $SELC_5$ has been input from the state machine 41, the multiplexer 43 outputs the extension-instruction operated-result data $EB_5$ to the integer register 44. What is to be noted here is that the existing-instruction operated-result data $EA_4$ (the extension-instruction operated-result data $EB_4$) the type of that is an integer, or the extension-instruction operated-result data $EB_5$, the type of that is a floating-point numeric value, is stored into the integer register 44.

On the other hand, the instruction decoder 50 decodes the 32-bit second existing instruction and the 32-bit second extension instruction into the 12-bit operation codes (the existing instruction $CA_5$ and the extension instruction $CB_5$). These existing instruction $CA_5$ and extension instruction $CB_5$ are each expressed as follows when so done in the form of a hexadecimal representation (binary representation).

Existing instruction $CA_5$: 0x1ff (000111111111)
Extension instruction $CB_5$: 0x3ff (001111111111)

The bits constituting each of these existing instruction $CA_5$ and extension instruction $CB_5$ that are actually effective as the instructions are "11:10, 8:0" bits, in the same way as in the first embodiment. For this reason, because the respective "11:10, 8:0" bits of the existing instruction $CA_5$ and extension instruction $CB_5$ each have the same value, each of these instructions is an instruction that has the same bit construction. Also, the respective "9" bits of the existing instruction $CA_5$ and extension instruction $CB_5$ are dummy bits that are not used as the bits for use for the instruction.

However, in the fourth embodiment, those "9" bits are operated-result-data-type-determining bits for determining the type (an integer or a floating-point numeric value in this case) of the operated-result data to be stored into the integer register 44. Namely, when the "9" bits each have a value of "0", this means that the type of the operated-result data to be stored into the integer register 44 is an integer. On the other hand, when the "9" bits each have a value of "1", this means that the type of the operated-result data to be stored into the integer register 44 is a floating-point numeric value.

A pipeline control circuit 51 controls the notification of the existing instruction $CA_5$ and extension instruction $CB_5$ with respect to the existing floating-point numeric value addition-executing unit 52A and extension floating-point numeric value operation-executing unit 52B and the storage of the operated-result data into the floating-point numeric value register 54 or the integer register 44. Also, the pipeline control circuit 51 makes a pipeline control that is executed by each of the existing floating-point numeric value addition-executing unit 52A and the extension floating-point numeric value operation-executing unit 52B. It is to be noted here that the number of the pipeline stages of the existing floating-point numeric value addition-executing unit 52A and that of the pipeline stages of the extension floating-point numeric value operation-executing unit 52B are different from each other.

The existing floating-point numeric value addition-executing unit 52A is an existing-operation-executing unit, which according to the existing instruction $CA_5$ performs floating-point numeric value addition and outputs the operated result as the existing-instruction operated-result data $EA_5$. The extension floating-point numeric value operation-executing unit 52B performs floating-point numeric value operation according to the extension instruction $CB_5$ corresponding to the request made by customizing and outputs the operated result as the extension-instruction operated-result data $EB_5$. The multiplexer 53 selects either one of the existing-instruction operated-result data $EA_5$ and the extension-instruction operated-result data $EB_5$ according to the control of the pipeline control circuit 51 and outputs this selected data to the floating-point numeric value register 54. Specifically, when the selecting signal $SELA_6$ has been input from the pipeline control circuit 51, the multiplexer 53 outputs the existing-instruction operated-result data $EA_5$ to the floating-point numeric value register 54.

On the other hand, when the selecting signal $SELB_6$ has been input from the pipeline control circuit 51, the multiplexer 53 outputs the extension-instruction operated-result data $EB_5$ to the floating-point numeric value register 54. The floating-point numeric value register 54 temporarily stores the existing-instruction operated-result data $EA_5$ or the extension-instruction operated-result data $EB_5$ therein.

Figure 9:
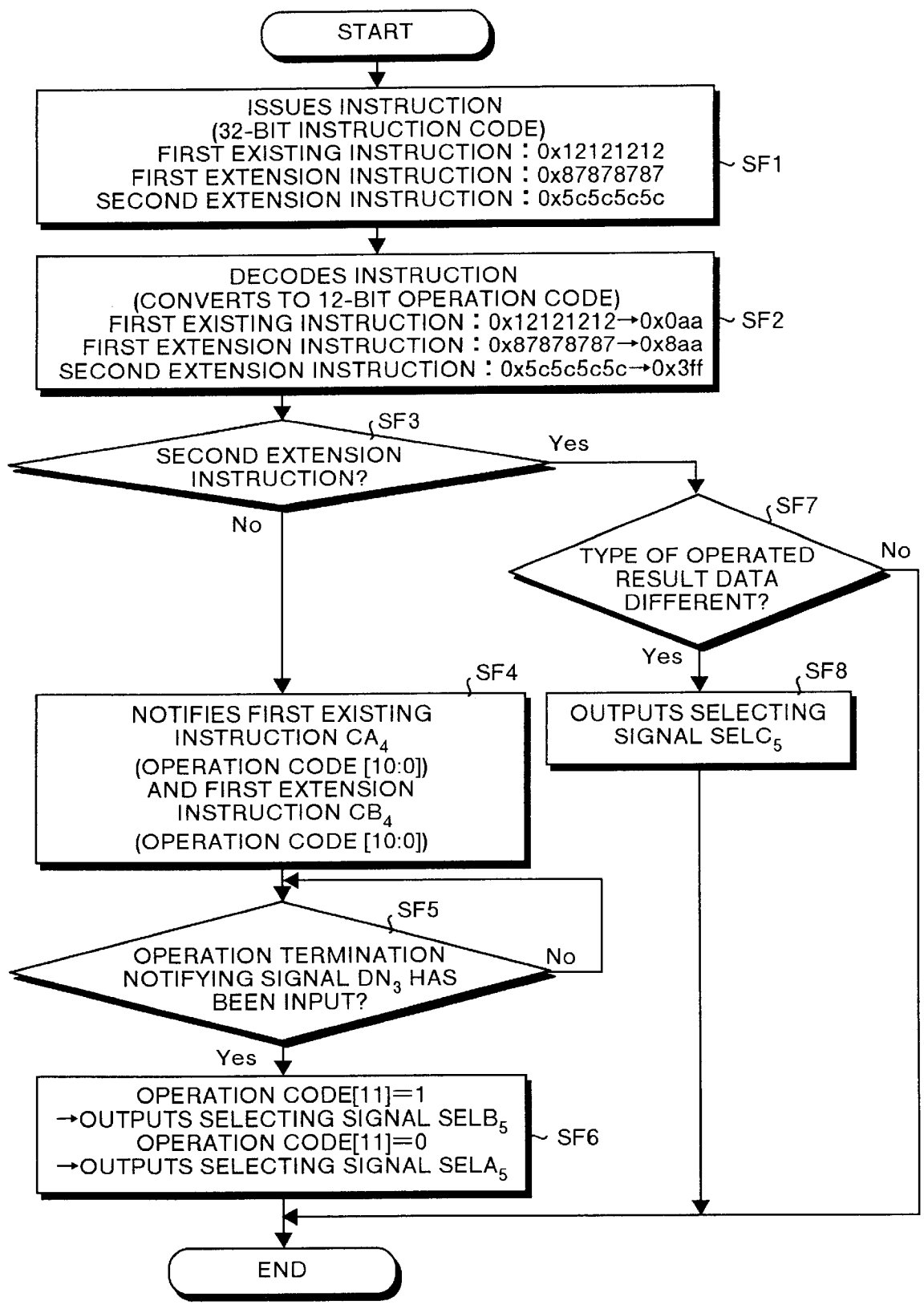
FIG. 9 is a flow chart illustrating the operation of a state machine 41 side illustrated in FIG. 8.
Figure 10:
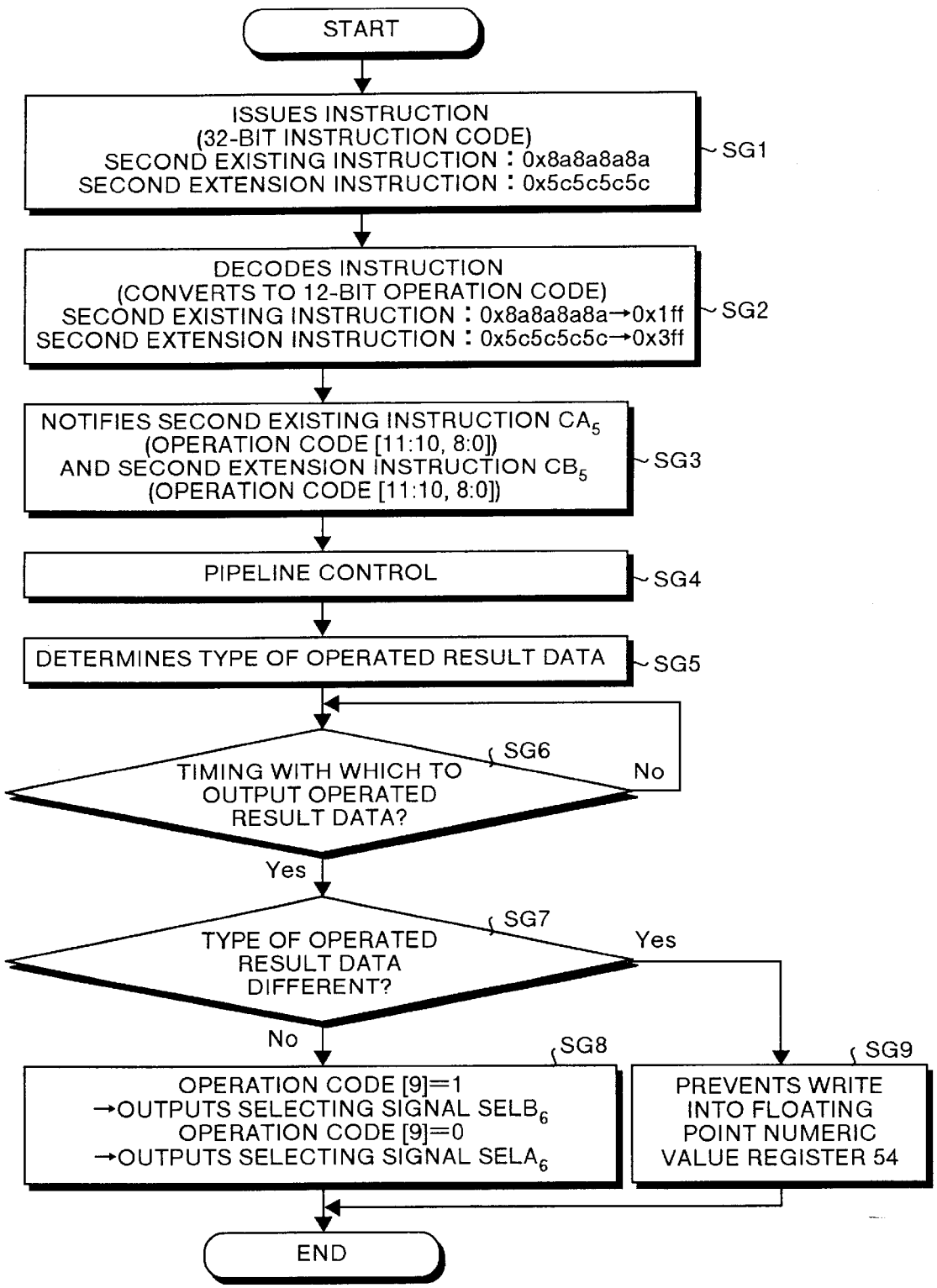
FIG. 10 is a flow chart illustrating the operation of a pipeline control circuit 51 side illustrated in FIG. 8.

Next, the operation of the above-described fourth embodiment will be explained with reference to flow charts that are illustrated in FIGS. 9 and 10. When in a step SF1 illustrated in FIG. 9 the 32-bit first existing instruction (0x12121212) is issued, in step SF2 the instruction decoder 40 converts the first existing instruction (0x12121212) into the 12-bit operation code (0x0aa (000010101010)). Thereafter, the instruction decoder 40 notifies the thus-converted data to the state machine 41.

In step SF3, the state machine 41 determines whether the second extension instruction has been decoded by the instruction decoder 40 and, in this case, makes the determination result "No". In step SF4, the state machine 41 notifies the extension instruction $CB_4$ (in this case 0x0aa (000010101010)) and existing instruction $CA_4$ (in this case 0x0aa (000010101010)), each of that consists of the same-value bits as the instruction, to the extension-integer-operation-executing unit 42B and existing-integer-multiplication/division-operation-executing unit 42A.

As a result of this, in the extension-integer-operation-executing unit 42B, the operation is executed according to the extension instruction $CB_4$ while, in the existing-integer-multiplication/division-executing unit 42A, the operation is executed according to the existing instruction $CA_4$. In parallel with these operation processes, in step SF5, the state machine 41 determines whether the operation-termination-notifying signal $DN_3$ has been input from the existing-integer-multiplication/division-executing unit 42A. In this case, the determination result is made to be "No" and that determination is repeatedly performed.

And, when the determination result of step SF5 becomes "Yes", in step SF6 the state machine 41 determines the type of the instruction according to, the 11 bits (in this case each have a value of "0") of the operation code (0x0aa (000010101010)) that has been so converted by the instruction decoder 40. In this case, because those 11 bits each have a value of "0", the state machine 41 determines the type of the instruction to be the first existing instruction.

Next, because the operation code "11" bits are all "0", the state machine 41 outputs the selecting signal $SELA_5$ to the multiplexer 43. As a result of this, in the multiplexer 43, the existing-instruction operated-result data $EA_4$ is selected, and this existing-instruction operated-result data $EA_4$ is stored into the integer register 44.

On the other hand, when in the step SF1 the 32-bit first extension instruction (0x87878787) is issued, in step SF2 the instruction decoder 40 converts the first extension instruction (0x87878787) into the 12-bit operation code (0x8aa (100010101010)). Thereafter, the instruction decoder 40 notifies the thus-converted data to the state machine 41.

In step SF3, the state machine 41 determines whether the second extension instruction has been decoded by the instruction decoder 40 and, in this case, makes the determination result "No". In step SF4, the state machine 41 notifies the extension instruction $CB_4$ (in this case 0x8aa (100010101010)) and existing instruction $CA_4$ (in this case 0x8aa (100010101010)), each of that consists of the same-value bits as the instruction, to the extension-integer-operation-executing unit 42B and existing-integer-multiplication/division-operation-executing unit 42A.

As a result of this, in the extension-integer-operation-executing unit 42B, the operation is executed according to the extension instruction $CB_4$ while, in the existing-integer-multiplication/division-executing unit 42A, the operation is executed according to the existing instruction $CA_4$. In parallel with these operation processes, in step SF5, the state machine 41 determines whether the operation-termination-notifying signal $DN_3$ has been input from the existing-integer-multiplication/division-executing unit 42A. In this case, the determination result is made to be "No" and that determination is repeatedly performed.

And, when the determination result of step SF5 becomes "Yes", in step SF6 the state machine 41 determines the type of the instruction according to the 11 bits (in this case each have a value of "1") of the operation code (0x8aa (100010101010)) that has been so converted by the instruction decoder 40. In this case, because those 11 bits each have a value of "1", the state machine 41 determines the type of the instruction to be the first extension instruction.

Next, because the operation code "11" bits are all "1", the state machine 41 outputs the selecting signal SELB$_5$ to the multiplexer 43. As a result of this, in the multiplexer 43, the extension-instruction operated-result data EB$_4$ is selected, and this extension-instruction operated-result data EB$_4$ is stored into the integer register 44.

When in a step SG1 illustrated in FIG. 10 the 32-bit second existing instruction (0x8a8a8a8a) is issued, in step SG2 the instruction decoder 50 converts the second existing instruction (0x8a8a8a8a) into the 12-bit operation code (0x1ff (000111111111)). Thereafter, the instruction decoder 50 notifies the thus-converted data to the pipeline control circuit 51.

In step SG3, the pipeline control circuit 51 notifies the extension instruction CB$_5$ (in this case 0x1ff (000111111111)) and existing instruction CA$_5$ (in this case 0x1ff (000111111111)), each of that consists of the same-value bits as the instruction, to the extension-floating-point numeric value-operation-executing unit 52B and existing-floating-point numeric value-addition-executing unit 52A.

In step SG4, according to the extension instruction CB$_5$ and existing instruction CA$_5$, the pipeline control circuit 51 performs pipeline control with respect to the existing-floating-point numeric value-addition-executing unit 52A and the extension-floating-point numeric value-operation-executing unit 52B. In step SG5, the pipeline control circuit 51 determines the type of the operated-result data to be stored into the integer register 44 according to the instruction from the instruction decoder 50.

In step SG6, the pipeline control circuit 51 determines whether the timing is the one with which to output the operated-result data (the existing-instruction operated-result data EA$_5$, the extension-instruction operated-result data EB$_5$). In this case, the determination result is made to be "No", whereby that determination is repeatedly performed. And upon completion of the operation, the pipeline control circuit 51 makes the determination result of step SG6 "Yes". In step SG7, the pipeline control circuit 51, according to the determination result of step SG5, determines whether the type of the operated-result data is different. In this case, the determination result is made to be "No".

In step SG8, because the "9" bits of the operation code (0x1ff (000111111111) are all "0", the pipeline control circuit 51 outputs the selecting signal SELA$_6$ to the multiplexer 53. As a result of this, the existing-instruction operated-result data EB$_5$ is selected, and this existing-instruction operated-result data EA$_5$ is stored into the floating-point numeric value register 54. It is to be noted that when the "9" bits of the operation code are all "1", the pipeline control circuit 51 outputs the selecting signal SELB$_6$ to the multiplexer 53. In this case, the extension-instruction operated-result data EB$_5$ is selected, and this extension-instruction operated-result data EB$_1$ is stored into the floating-point numeric value register 54.

When in the step SG1 the 32-bit second extension instruction (0x5c5c5c5c) is issued, in step SG2 the instruction decoder 50 converts the second extension instruction (0x5c5c5c5c) into the 12-bit operation code (0x3ff (001111111111)). Thereafter, the instruction decoder 50 notifies the thus converted data to the pipeline control circuit 51.

In step SG3, the pipeline control circuit 51 notifies the extension instruction CB$_5$ (in this case 0x3ff (001111111111)) and existing instruction CA$_1$ (in this case 0x3ff (001111111111)), each of that consists of the same-value bits as the instruction, to the extension-floating-point numeric value-operation-executing unit 52B and existing-floating-point numeric value-addition-executing unit 52A.

In step SG4, according to the extension instruction CB$_5$ and existing instruction CA$_5$, the pipeline control circuit 51 performs pipeline control with respect to the existing-floating-point numeric value-addition-executing unit 52A and the extension-floating-point numeric value-operation-executing unit 52B. In step SG5, the pipeline control circuit 51 determines the type of the operated-result data to be stored into the integer register 44 according to the instruction from the instruction decoder 50.

In step SG6, the pipeline control circuit 51 determines whether the timing is the one with which to output the operated-result data (the existing-instruction operated-result data EA$_5$, the extension-instruction operated-result data EB$_5$). In this case, the determination result is made to be "No", whereby that determination is repeatedly performed. And upon completion of the operation, the pipeline control circuit 51 makes the determination result of step SG6 "Yes". In step SG7, the pipeline control circuit 51, according to the determination result of step SG5, determines whether the type of the operated-result data is different. In this case, the determination result is made to be "Yes".

In step SG9, the pipeline control circuit 51 prevents data from being written into the floating-point numeric value register 54. Accordingly, in the floating-point numeric value register 54, none of the operated-result data is held. Also, the extension-instruction operated result data EB$_5$ is input to the multiplexer 43. Here, when the second extension instruction is issued with respect to the instruction decoder 40, the state machine 41 makes the determination result of a step SF3 illustrated in FIG. 9 "Yes".

In step SF7, the state machine 41 determines whether the type of the operated-result data is different, and, in this case, makes the determination result "Yes". In step SF8, the state machine 41 outputs the selecting signal SELC$_5$ to the multiplex 43. As a result of this, the multiplexer 43 selects the extension-instruction operated-result data EB$_5$ and this the extension-instruction operated-result data EB$_5$ is stored into the integer register 44.

Figure 11:
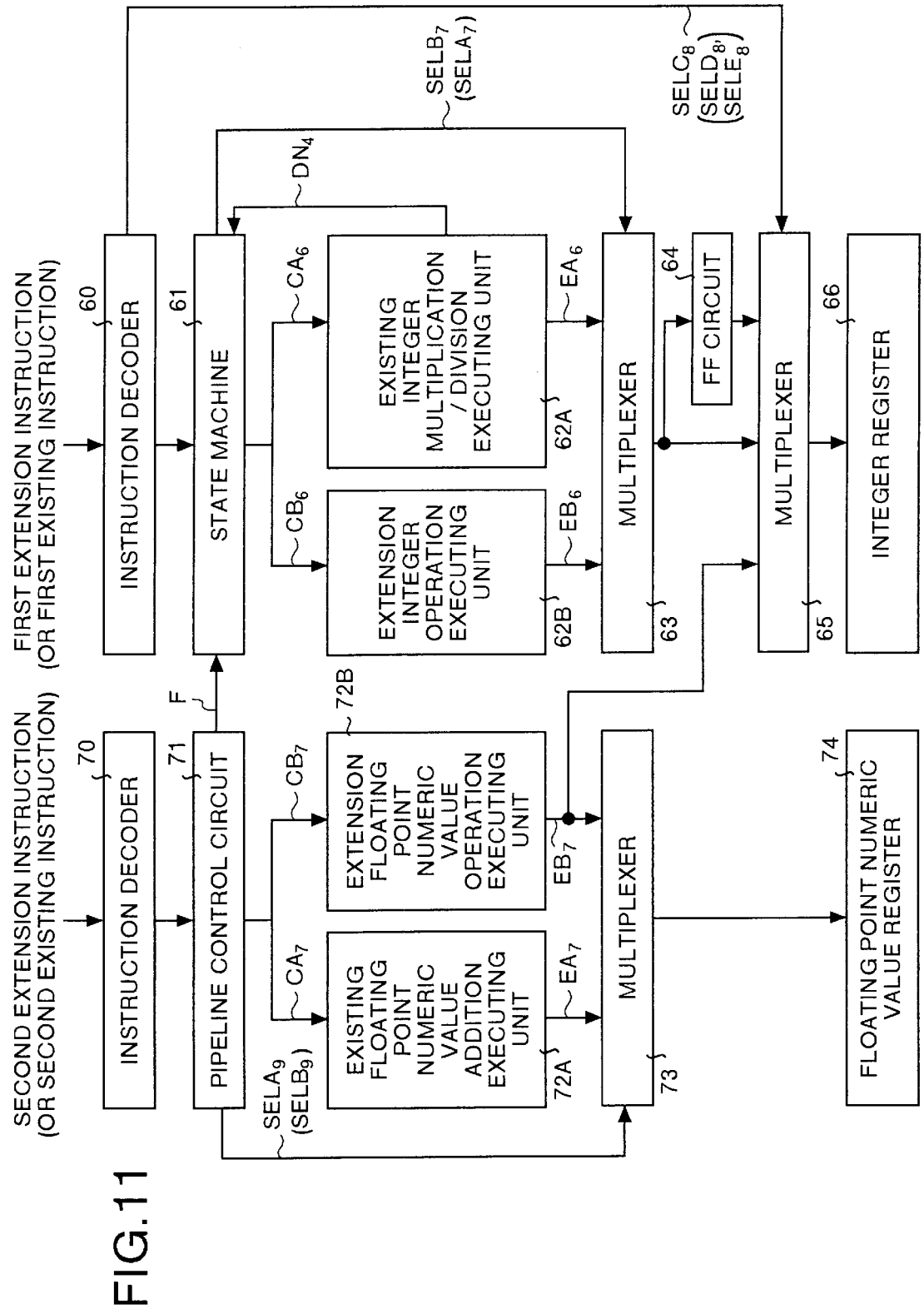
FIG. 11 is a block diagram illustrating the construction of a fifth embodiment of the present invention.

FIG. 11 is a block diagram illustrating the construction of a fifth embodiment of the present invention. In this figure, illustration is made of the construction of a main part of the operation-processing apparatus after the first and the second extension instruction are added to the first and the second existing instruction according to the request made by customizing. Here, the first existing instruction is an integer/division instruction while the first extension instruction is an integer operation instruction. Also, the second existing instruction is a floating-point-numeric-value addition instruction while the second extension instruction is a floating-point-numeric-value operation instruction. This second extension instruction is a specific instruction for causing a different type of operated-result data (in this case an extension-instruction operated-result data EB$_7$) to be stored into an integer register 66 in the same way as in the second embodiment.

Each of these first and second existing instructions and first and second extension instructions, in the same way as in the fourth embodiment, consists of an instruction code composed of 32 bits, and each of them is expressed as follows when so done in the form of a hexadecimal representation.

First existing instruction: 0x12121212
First extension instruction: 0x87878787
Second existing instruction: 0x4b4b4b4b
Second extension instruction: 0x9a9a9a9a The instruction decoder 60 decodes the 32-bit first existing instruction and 32-bit first extension instruction into 12-bit operation codes (the existing instruction $CA_6$ and the extension instruction $CB_6$). These existing instruction $CA_6$ and extension instruction $CB_6$ are respectively expressed as follows when so done each in the form of a hexadecimal representation (binary representation).

Existing instruction $CA_6$: 0x0aa (000010101010)

Extension instruction $CB_6$: 0x8aa (100010101010)

The bits constituting each of these existing instruction $CA_6$ and extension instruction $CB_6$ that are actually effective as the instructions are "10:0" bits. For this reason, because the respective "10:0" bits of the existing instruction $CA_6$ and extension instruction $CB_6$ each have the same value, each of these instructions is an instruction that has the same bit construction. Also, the respective 11 bits of the existing instruction $CA_6$ and extension instruction $CB_6$ are dummy bits that are not used as the bits for use for the instruction.

However, in the fifth embodiment, those 11 bits are instruction-type-determining bits for determining the type of the existing instruction $CA_6$ and the extension instruction $CB_6$. Namely, when the 11 bits each have a value of "0", the type of the instruction is the first existing instruction while when the 11 bits each have a value of "1", the type of the instruction is the first extension instruction.

A state machine 61 controls the notification of the existing instruction $CA_6$ and extension instruction $CB_6$ with respect to the existing integer-multiplication/division-executing unit 62A and extension-integer-operation-executing unit 62B and the storage of the operated-result data into the integer register 66. The existing integer-multiplication/division-executing unit 62A is an existing-operation-executing unit. According to the existing instruction $CA_6$, that unit executes integer multiplication/division, and outputs to the state machine 61 the operation-termination-notifying signal $DN_4$ indicating the effect that the operation has ended. Also, the existing integer-multiplication/division-executing unit 62A outputs the operated-result data as the existing-instruction operated-result data $EA_6$.

The extension integer-operation-executing unit 62B is the unit that has been added to the existing mechanism according to the request made by customizing and executes integer operation according to the extension instruction $CB_6$. This extension integer-operation-executing unit 62B outputs the operated-result data as the extension-instruction operated-result data $EB_6$. Here, the number of the operation-termination cycles of the existing-integer-multiplication/division-executing unit 62A and the number of the operation-termination cycles of the extension-integer-operation-executing unit 62B are the same in value. What is to be noted here is that no signal corresponding to the operation-termination-notifying signal $DN_4$ is output from the extension-integer-operation-executing unit 62B. Also, the type (an integer in this case) of the existing-instruction operated-result data $EA_6$ and the type (an integer in this case) of the extension-instruction operated-result data $EB_6$ are made to be the same in type.

The multiplexer 63 selects either one of the existing-instruction operated-result data $EA_6$ and the extension-instruction operated-result data $EB_6$ according to the control of the state machine 61. Specifically, when the selecting signal $SELA_7$ has been input from the state machine 61, the multiplexer 63 selects the existing-instruction operated-result data $EA_6$ while when the selecting signal $SELB_7$ has been input from the state machine 61, the multiplexer 63 selects the extension-instruction operated-result data $EB_6$.

The FF circuit 64 holds the existing-instruction operated-result data $EA_6$ (or the extension-instruction operated-result data $EB_6$) selected by the multiplexer 63. The multiplexer 65 selects either one of the extension-instruction operated-result data $EB_7$, the operated-result data directly output from the multiplexer 63, or the operated-result data stored in the FF circuit 64 and outputs the selected data to the integer register 66.

Concretely, when the selecting signal $SELC_8$ has been input from the state machine 61, the multiplexer 65 selects the extension-instruction operated-result data $EB_7$. Also, when the selecting signal $SELD_8$ has been input from the state machine 61, the multiplexer 65 selects the operated-result data directly output from the multiplexer 63. Further, when the selecting signal $SELE_8$ has been input from the state machine 61, the multiplexer 65 selects the operated-result data stored in the FF circuit 33.

On the other hand, the instruction decoder 70 decodes the 32-bit second existing instruction and the 32-bit second extension instruction into the 12-bit operation codes (the existing instruction $CA_7$ and the extension instruction $CB_7$) These existing instruction $CA_7$ and extension instruction $CB_7$ are each expressed as follows when so done in the form of a hexadecimal representation (binary representation).

Existing instruction $CA_7$: 0x0ff (000011111111)

Extension instruction $CB_7$: 0x8ff (100011111111)

The bits constituting each of these existing instruction $CA_7$ and extension instruction $CB_7$ that are actually effective as the instructions are "10:0" bits. For this reason, because the respective "10:0" bits of the existing instruction $CA_7$ and extension instruction $CB_7$ each have the same value, each of these instructions is an instruction that has the same bit construction. Also, the respective 11 bits of the existing instruction $CA_7$ and extension instruction $CB_7$ are dummy bits that are not used as the bits for use for the instruction.

However, in the fifth embodiment, those 11 bits are operated-result-data-type-determining bits for determining the type (an integer or a floating-point numeric value in this case) of the operated-result data to be stored into the integer register 66. Namely, when the 11 bits each have a value of "0", this means that the type of the operated-result data to be stored into the integer register 66 is an integer. On the other hand, when the 11 bits each have a value of "1", this means that the type of the operated-result data to be stored into the integer register 66 is a floating-point numeric value.

A pipeline control circuit 71 controls the notification of the existing instruction $CA_7$ with respect to the existing-floating-point numeric value addition-executing unit 72A and the storage of the operated-result data into the floating-point numeric value register 74. Also, the pipeline control circuit 71 makes a pipeline control that is executed by each of the existing-floating-point numeric value addition-executing unit 72A and the extension-floating-point numeric value operation-executing unit 72B. It simultaneously outputs a forwarding signal F to the state machine 61. This forwarding signal F is a signal that instructs that the extension-instruction operated-result data $EB_7$ should be forwarded to the integer register 66. Also, the number of the pipeline stages of the existing floating-point numeric value addition-executing unit 72A and that of the pipeline stages of the extension-floating-point numeric value operation-executing unit 72B are different.

The existing-floating-point numeric value addition-executing unit 72A is an existing-operation-executing unit, which according to the existing instruction $CA_7$ performs floating-point numeric value addition and outputs the operated result as the existing-instruction operated-result data $EA_7$. The extension-floating-point numeric value operation-executing unit 72B performs floating-point numeric value operation according to the extension instruction $CB_7$ corresponding to the request made by customizing and outputs the operated result as the extension-instruction operated-result data $EB_7$.

The multiplexer 73 selects either one of the existing-instruction operated-result data $EA_7$ and the extension-instruction operated-result data $EB_7$ according to the control of the pipeline control circuit 71 and outputs this selected data to the floating-point numeric value register 74. Specifically, when the selecting signal $SELA_9$ has been input from the pipeline control circuit 71, the multiplexer 73 outputs the existing-instruction operated-result data $EA_7$ to the floating-point numeric value register 74.

On the other hand, when the selecting signal $SELB_9$ has been input from the pipeline control circuit 71, the multiplexer 73 outputs the extension-instruction operated-result data $EB_7$ to the floating-point numeric value register 74. The floating-point numeric value register 74 temporarily stores the existing-instruction operated-result data $EA_7$ or the extension-instruction operated-result data $EB_7$ therein.

Figure 12:
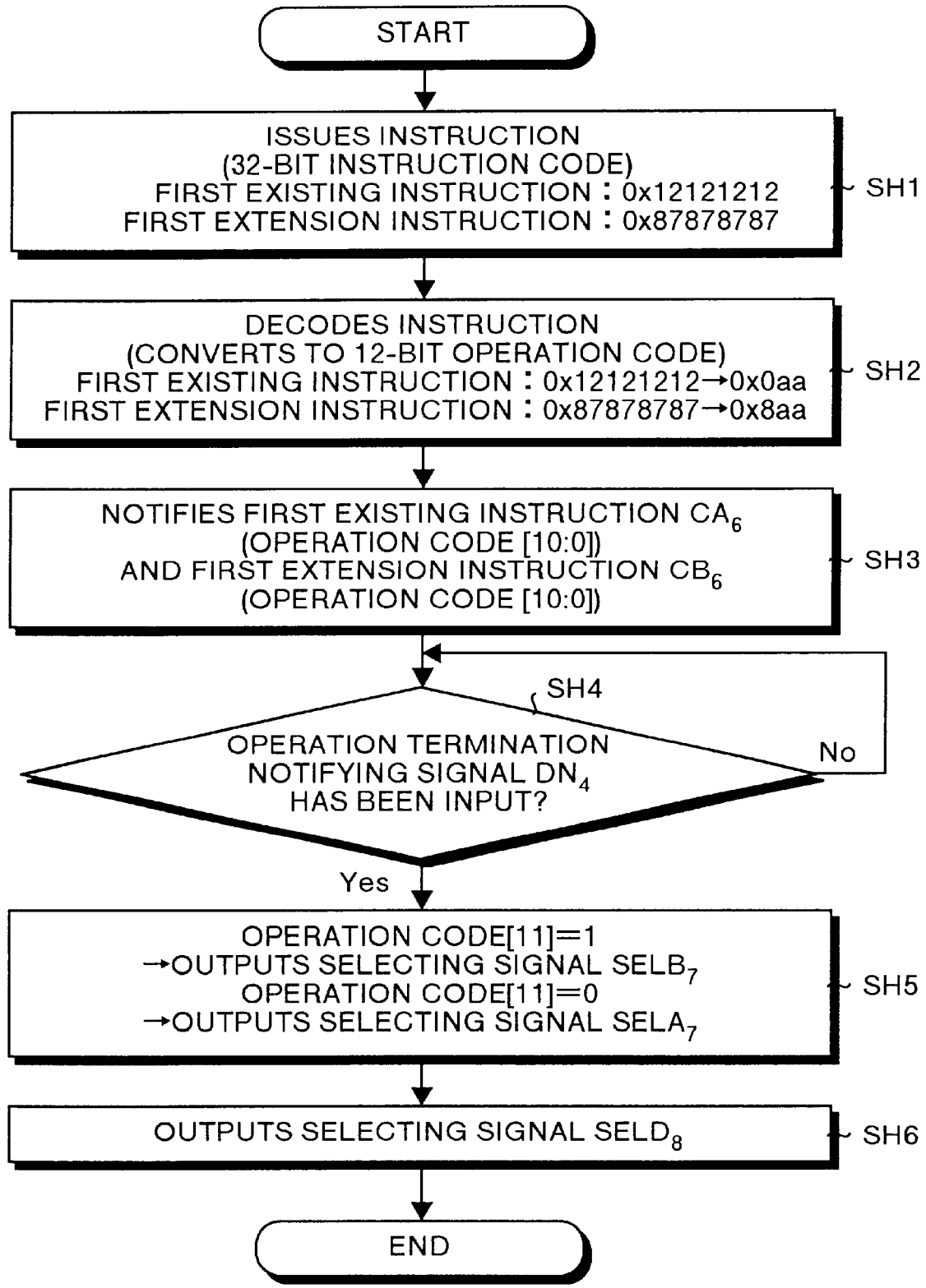
FIG. 12 is a flow chart illustrating the operation of a state machine 61 side illustrated in FIG. 11.
Figure 13:
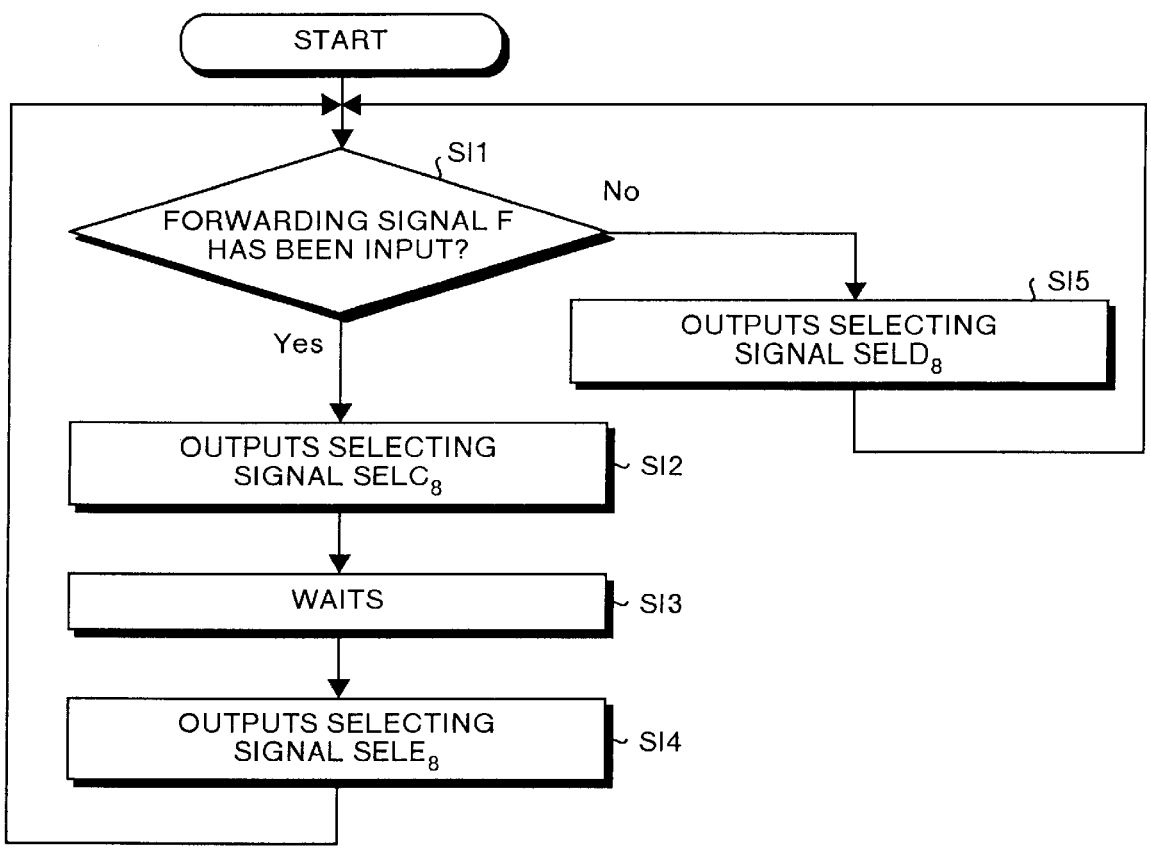
FIG. 13 is a flow chart illustrating the operation of a state machine 61 illustrated in FIG. 11.
Figure 14:
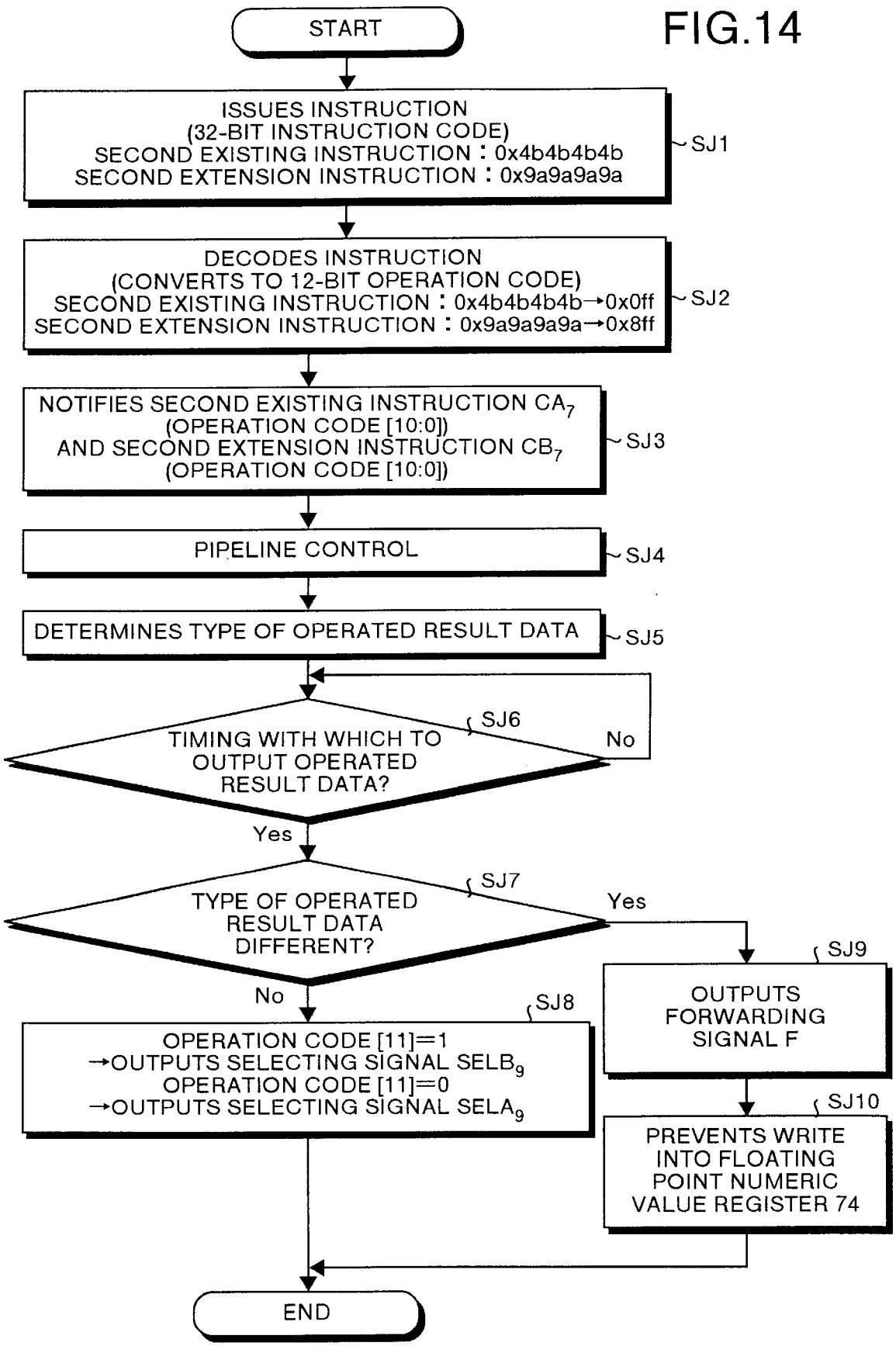
FIG. 14 is a flow chart illustrating the operation of a pipeline control circuit 71 side illustrated in FIG. 11.

Next, the operation of the above-described fifth embodiment will be explained with reference to flow charts that are illustrated in FIGS. 12 to 14. When in a step SH1 illustrated in FIG. 12 the 32-bit first existing instruction (0x12121212) is issued, in step SH2 the instruction decoder 60 converts the first existing instruction (0x12121212) into the 12-bit operation code (0x0aa (000010101010)). Thereafter, the instruction decoder 60 notifies the thus-converted data to the state machine 61.

In step SH3, the state machine 61 notifies the extension instruction $CB_6$ (in this case 0x0aa (000010101010)) and existing instruction,$CA_6$ (in this case 0x0aa (000010101010)), each of that consists of the same-value bits as the instruction, to the extension-integer-operation-executing unit 62B and existing-integer-multiplication/division-operation-executing unit 62A.

As a result of this, in the extension-integer-operation-executing unit 62B, the operation is executed according to the extension instruction $CB_6$ while, in the existing-integer-multiplication/division-executing unit 62A, the operation is executed according to the existing instruction $CA_6$. In parallel with these operation processes, in step SH4, the state machine 61 determines whether the operation-termination-notifying signal $DN_4$ has been input from the existing-integer-multiplication/division-executing unit 62A. In this case, the determination result is made to be "No" and that determination is repeatedly performed.

And, when the determination result of step SH4 becomes "Yes", in step SH5 the state machine 61 determines the type of the instruction according to the 11 bits (in this case each having a value of "0") of the operation code (0x0aa (000010101010)) that has been so converted by the instruction decoder 60. In this case, because those 11 bits each have a value of "0", the state machine 61 determines the type of the instruction to be the first existing instruction.

Next, because the operation code "11" bits are all "0", the state machine 61 outputs the selecting signal $SELA_7$ to the multiplexer 63. As a result of this, in the multiplexer 63, the existing-instruction operated-result data $EA_6$ is selected, and this existing-instruction operated-result data $EA_6$ is output to the multiplexer 65 and also is held into the FF circuit 64.

On the other hand, when in the step SI1 illustrated in FIG. 13 the state machine 61 determines whether the forwarding signal F has been input from the pipeline control circuit 71 and, in this case, makes the determination result "No". In step SI5, the state machine 61 outputs the selecting signal $SELD_8$ to the multiplexer 65. Thereby, in the multiplexer 65, the existing-instruction operated-result data $EA_6$ that has been directly output from the multiplexer 63 is selected. This existing-instruction operated-result data $EA_6$ is stored into the integer register 66.

On the other hand, when the 32-bit first extension instruction (0x87878787) is issued, in step SH2 the instruction decoder 60 converts the first extension instruction (0x87878787) into the 12-bit operation code (0x8aa (100010101010)). Thereafter, the instruction decoder 60 notifies the thus-converted data to the state machine 61.

In step SH3, the state machine 61 notifies the extension instruction $CB_6$ (in this case 0x8aa (100010101010)) and existing instruction $CA_6$ (in this case 0x8aa (100010101010)), each of that consists of the same-value bits as the instruction, to the extension-integer-operation-executing unit 62B and existing-integer-multiplication/division-operation-executing unit 62A.

As a result of this, in the extension-integer-operation-executing unit 62B, the operation is executed according to the extension instruction $CB_6$ while, in the existing-integer-multiplication/division-executing unit 62A, the operation is executed according to the existing instruction $CA_6$. In parallel with these operation processes, in step SH4, the state machine 61 determines whether the operation-termination-notifying signal $DN_4$ has been input from the existing-integer-multiplication/division-executing unit 62A. In this case, the determination result is made to be "No" and that determination is repeatedly performed.

And, when the determination result of step SH4 becomes "Yes", in step SH5 the state machine 61 determines the type of the instruction according to the 11 bits (in this case each having a value of "1") of the operation code (0x8aa (100010101010)) that has been so converted by the instruction decoder 60. In this case, because those 11 bits each have a value of "1", the state machine 61 determines the type of the instruction to be the first extension instruction.

Next, because the operation code "11" bits are all "1", the state machine 61 outputs the selecting signal $SELB_7$ to the multiplexer 63. As a result of this, in the multiplexer 63, the extension-instruction operated-result data $EB_6$ is selected. Also, in a step SI5 illustrated in FIG. 13, the state machine 61 outputs the selecting signal $SELD_8$ to the multiplexer 65. As a result of this, in the multiplexer 65, the extension-instruction operated-result data $EB_6$ is selected and the extension-instruction operated-result data $EB_6$ is held in the integer register 66 via the multiplexer 65.

When in a step SJ1 illustrated in FIG. 14 the 32-bit second existing instruction (0x4b4b4b4b) is issued, in step SJ2 the instruction decoder 70 converts the second existing instruction (0x4b4b4b4b) into the 12-bit operation code (0x0ff (000011111111)). Thereafter, the instruction decoder 70 notifies the thus-converted data to the pipeline control circuit 71.

In step SJ3, the pipeline control circuit 71 notifies the extension instruction $CB_7$ (in this case 0x0ff (000011111111)) and existing instruction $CA_7$ (in this case 0x0ff (000011111111)), each of that consists of the same-value bits as the instruction, to the extension-floating-point numeric value-operation-executing unit 72B and existing-floating-point numeric value-addition-executing unit 72A.

In step SJ4, according to the extension instruction $CB_7$ and existing instruction $CA_{71}$ the pipeline control circuit 71 performs pipeline control with respect to the extension-floating-point numeric value-operation-executing unit 72B and the existing-floating-point numeric value-addition-executing unit 72A. In step SJ5, the pipeline control circuit 71 determines the type of the operated-result data to be stored into the integer register 66 according to the instruction from the instruction decoder 70.

In step SJ6, the pipeline control circuit 71 determines whether the relevant point in time is the timing with which to output the operated-result data (the existing-instruction operated-result data $EA_7$, the extension-instruction operated-result data $EB_7$). In this case, the determination result is made to be "No", whereby that determination is repeatedly performed. And upon completion of the operation, the pipeline control circuit 71 makes the determination result of step SJ6 "Yes". In step SJ7, the pipeline control circuit 71, according to the determination result of step SJ5, determines whether the type of the operated-result data is different. In this case, the determination result is made to be "No".

In step SJ8, because the 11 bits of the operation code (0x0ff (000011111111)) are all "0", the pipeline control circuit 71 outputs the selecting signal $SELA_9$ to the multiplexer 73. Thereby, the existing-instruction operated-result data $EA_7$ is selected, whereby the existing-instruction operated-result data $EA_7$ is stored into the floating-point numeric value register 74. It is to be noted that in case that the 11 bits of the operation code are all "1", the pipeline control circuit 71 outputs the selecting signal $SELB_9$ to the multiplexer 73. In this case, the extension-instruction operated-result data $EB_7$ is selected, whereby this extension-instruction operated-result data $EB_7$ is stored into the floating-point numeric value register 74.

When the 32-bit second extension instruction (0x9a9a9a9a) is issued, in step SJ2 the instruction decoder 70 converts the second extension instruction (0x9a9a9a9a) into the 12-bit operation code (0x8ff (100011111111)). Thereafter, the instruction decoder 70 notifies the thus-converted data to the pipeline control circuit 71.

In step SJ3, the pipeline control circuit 71 notifies the extension instruction $CB_7$ (in this case 0x8ff (100011111111)) and existing instruction $CA_7$ (in this case 0x8ff (100011111111)), each of that consists of the same-value bits as the instruction, to the extension-floating-point numeric value-operation-executing unit 72B and existing-floating-point numeric value-addition-executing unit 72A.

In step SJ4, according to the extension instruction $CB_7$ and existing instruction $CA_7$, the pipeline control circuit 71 performs pipeline control with respect to the extension-floating-point numeric value-operation-executing unit 72B and the existing-floating-point numeric value-addition-executing unit 72A. In step SJ5, the pipeline control circuit 71 determines the type of the operated-result data to be stored into the integer register 66 according to the instruction from the instruction decoder 70.

In step SJ6, the pipeline control circuit 71 determines whether the relevant point in time is the timing with which to output the operated-result data (the existing-instruction operated-result data $EA_7$, the extension-instruction operated-result data $EB_7$). In this case, the determination result is made to be "No", whereby that determination is repeatedly performed. And upon completion of the operation, the pipeline control circuit 71 makes the determination result of step SJ6 "Yes". In step SJ7, the pipeline control circuit 71, according to the determination result of step SJ5, determines whether the type of the operated-result data is different. In this case, the determination result is made to be "Yes".

In step SJ9, the pipeline control circuit 71 outputs the forwarding signal F to the state machine 61. In step SJ10, the pipeline control circuit 71 prevents data from being written into the floating-point numeric value register 74. Accordingly, in the floating-point numeric value register 74, none of the operated-result data is held. Also, the extension-instruction operated result data $EB_7$ is input to the multiplexer 65.

Also, when the forwarding signal F is input to the state machine 61, the state machine 61 makes the determination result of a step SI1 illustrated in FIG. 13 "Yes". In step SI2, the state machine 61 outputs the selecting signal $SELC_8$ to the multiplexer 65. As a result of this, in the multiplexer 65, the extension-instruction operated-result data $EB_7$ is selected, and this extension-instruction operated-result data $EB_7$ is stored into the integer register 66.

In step SI3, the state machine 61 waits for a prescribed period of time. Upon completion of the operation, the existing-instruction operated-result data $EA_6$ or the extension-instruction operated-result data $EB_6$ is directly output to the multiplexer 65 and also is stored in the FF circuit 64. And, upon passe of a prescribed time period, in step SI4 the state machine 61 outputs the selecting signal $SELE_8$ to the multiplexer 65.

As a result of this, in the multiplexer 65, the existing-instruction operated-result data $EA_6$ (or the extension-instruction operated-result data $EB_6$) stored in the FF circuit 64 is selected. This existing-instruction operated-result data $EA_6$ (or the extension-instruction operated-result data $EB_6$ is stored into the integer register 66. In this way, the state machine 61 performs mediation between the timing of the storage of the extension-instruction operated-result data $EB_7$ into the integer register 66 and the timing of the storage of the existing-instruction operated-result data $EA_6$ (or the extension-instruction operated-result data $EB_6$) into it.

As has been described above, according to the invention as claimed under the first aspect of claim, the operation code is made to contain the instruction-type-determining information. Thereby, even when the extension instruction has been issued, utilizing the operation-termination-notifying signal output from the existing-operation-executing means, the termination of the operation of the extension-operation-executing means is recognized to thereby select the operated-result data of the extension-operation-executing means. Therefore, it is advantageously possible to add the extension instruction to the existing mechanism with a minimum necessary change in design made with respect thereto.

Also, according to the invention as claimed under the second aspect of claim, it is arranged that when the type of the instruction has been determined to be the existing instruction there is selected the operated-result data of the existing-operation-executing means. Therefore, it is advantageously possible to add the extension instruction without making any change of the existing-operation-executing means.

Also, according to the invention as claimed under the third aspect of claim, it is arranged that according to the type-determining information contained in the operation code the operated-result data of the extension-operation-executing means is forwarded to the first holding means. Therefore, it is advantageously possible to add the extension instruction to the existing mechanism with a minimum necessary change in design made with respect thereto.

Also, according to the invention as claimed under the fourth aspect of claim, it is arranged to output the operation-termination-notifying signal regarding the extension-operation-executing means and, according to the type-determining information contained in the operation code, to forward the operated-result data of the extension-operation-executing means to the first holding means. Therefore, even when the extension-operation-executing means and the existing-operation-executing means operate in asynchronism with each other, it is advantageously possible to add the extension instruction to the existing mechanism with a minimum necessary change in design made with respect thereto.

Also, according to the invention as claimed under the fifth aspect of claim, it is arranged that the timing-mediating means performs mediation between the outputting timing of the operated-result data of the existing-operation-executing means taken with respect to the first holding means and the forwarding timing of the operated-result data of the extension-operation-executing means. Therefore, it is advantageously possible to prevent batting that would occur with the same timing from occurring.

Also, according to the invention as described under Addition No. 3, by providing the selecting means, it is arranged to select the operated-result data made to be held in the holding means according to the determined result of the type of the instruction. Therefore, advantageously, it is not necessary to add the holding means for use for the extension instruction, with the result that the cost can be reduced.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An operation-processing apparatus, comprising:
   an instruction-decoding unit decoding an existing instruction into an operation code including at least instruction-type-determining information for determining whether the instruction is an existing instruction or an extension instruction;
   an existing-operation-executing unit executing an existing operation according to the operation code and outputting an operation-termination-notifying signal;
   an extension-operation-executing unit operating in synchronism with the existing-operation-executing unit to execute an extension operation according to the operation code;
   a control unit determining whether the instruction is the existing instruction or the extension instruction based on the instruction-type-determining information; and
   a selection unit selecting data generated as a result of the extension operation executed by the extension-operation-executing unit, when
      the instruction has been determined to be the extension instruction, and
      the control unit receives the operation-termination-notifying signal.

2. The operation-processing apparatus according to claim 1, wherein the selecting unit selects data generated as a result of the existing operation executed by the existing-operation-executing unit, when the instruction has been determined to be the existing instruction and the control unit receives the operation-termination-notifying signal.

3. The operation-processing apparatus according to claim 1, further comprising a holding unit holding the data selected by the selecting unit.

4. An operation-processing apparatus comprising:
   instruction-decoding unit which decodes an existing instruction and an extension instruction into the same operation code including at least type-determining information for determining the type of operated result data regarding a forwarded destination;
   existing-operation-executing unit which executes an existing operation regarding a first type according to the operation code and outputting an operation-termination-notifying signal;
   first holding unit that is provided in correspondence with the existing-operation-executing unit;
   extension-operation-executing unit that operates in synchronism with the existing-operation-executing unit to thereby execute an extension operation regarding a second type according to the operation code;
   second holding unit that is provided in correspondence with extension-operation-executing unit; and
   forwarding unit that, when
      it has been determined according to the type determining information that the type of the operated result data of the extension-operation-executing unit is different from the type of the data of the first holding unit constituting the forwarded destination and
      the operation-termination-notifying signal has been input, forwards the operated-result data of the extension-operation-executing unit to the first holding unit.

5. An operation-processing apparatus, comprising:
   instruction-decoding unit which decodes an existing instruction and an extension instruction into the same operation code including at least type-determining information for determining the type of operated-result data regarding a forwarded destination;
   existing-operation-executing unit which executes an existing operation regarding a first type according to the operation code;
   first holding unit that is provided in correspondence with the existing-operation-executing unit;
   extension-operation-executing unit that operates in asynchronism with the existing-operation-executing unit to thereby execute an extension operation regarding a second type according to the operation code;
   outputting unit which outputs an operation-termination-notifying signal indicating the effect that the operation of the extension-operation-executing unit has ended;
   second holding unit that is provided in correspondence with extension-operation-executing unit; and
   forwarding unit that, when
      it has been determined according to the type-determining information that the type of the operated-result data of the extension-operation-executing unit is different from the type of the data of the first holding unit constituting the forwarded destination and
      when the operation-termination-notifying signal has been input, forwards the operated-result data of the extension-operation executing unit to the first holding unit.

6. An operation-processing apparatus according to claim 5, further comprising: mediating unit which, when the operation-termination-notifying signal as been input, performing mediation between an outputting timing of the operated-result data of the existing-operation-executing unit taken with respect to the first holding unit and a forwarding timing of the operated result data of the extension-operation-executing unit taken with respect to the first holding unit.

* * * * *

UNITED STATES PATENT AND TRADEMARK OFFICE
CERTIFICATE OF CORRECTION

PATENT NO.    : 6,763,449 B1
DATED         : July 13, 2004
INVENTOR(S)   : Fumitake Sugano et al.

It is certified that error appears in the above-identified patent and that said Letters Patent is hereby corrected as shown below:

Column 29,
Line 25, delete "existing".

Signed and Sealed this

Twenty-sixth Day of October, 2004

JON W. DUDAS
*Director of the United States Patent and Trademark Office*